United States Patent [19]
Mastrobuono

[11] 3,811,275
[45] May 21, 1974

[54] ROTARY TURBINE ENGINE

[76] Inventor: Antonio C. Mastrobuono, 25 Woodland, Belmont, Mass. 02148

[22] Filed: Apr. 23, 1973

[21] Appl. No.: 353,524

Related U.S. Application Data

[63] Continuation-in-part of Ser. No. 8,918, Feb. 5, 1970, abandoned, which is a continuation-in-part of Ser. No. 870,615, Oct. 27, 1969, abandoned, which is a continuation-in-part of Ser. No. 812,667, April 2, 1969, abandoned.

[52] U.S. Cl........... 60/39.34, 60/39.15, 60/39.16 R, 60/39.35, 60/39.5, 60/39.66, 60/39.75, 60/39.78
[51] Int. Cl. ............................................. F02c 5/02
[58] Field of Search............ 60/39.34, 39.35, 39.75, 60/39.78

[56] References Cited
UNITED STATES PATENTS

| 684,743 | 10/1901 | Burger | 60/39.34 |
| 1,333,204 | 3/1920 | Eisele | 60/39.34 |
| 2,999,357 | 9/1961 | Elling | 60/39.34 |
| 3,089,307 | 5/1963 | Kollander | 60/39.34 |
| 3,145,533 | 8/1964 | Ollinger | 60/39.34 |

FOREIGN PATENTS OR APPLICATIONS

| 23,479 | 9/1901 | Great Britain | 60/39.34 |
| 434,865 | 5/1948 | Italy | 60/39.34 |
| 440,500 | 1/1936 | Great Britain | 60/39.34 |

*Primary Examiner*—Clarence R. Gordon

[57] ABSTRACT

A rotary turbine engine comprising a drive shaft, a rotor integral with the drive shaft, and a substantially cylindrical stationary casing surrounding the rotor, the rotor comprising a plurality of combustion chambers spaced radially with respect to the drive shaft. Each combustion chamber comprises spaced end walls substantially normal to the axis of the drive shaft and has a nozzle extending outwardly from the chamber with its axis directed towards peripheral wall of the casing. Each combustion chamber also comprises a substantially arcuate wall extending between said end walls formed by a substantially arcuate plane which is generated about a line which is substantially at the intersection of a plane which coincides with the longitudinal axis of the nozzle and a plane which substantially coincides with a radius of the rotor which is substantially normal to the second plane. The engine also comprises means for supercharging the combustion chambers comprising a centrifugal air compressor driven by the drive shaft at a substantially higher speed than the drive shaft and means for providing communication between said centrifugal air compressor and said combustion chambers for at least initially supercharging the combustion chambers, means for injecting ignitable gas to the combustion chambers and means for igniting the gas in the chambers to cause expansion thereof and the expanded gases to emerge from the nozzles thereby causing rotation of the rotor.

The engine is capable of many uses for example in vehicles such as automobiles, tractors, trains and airplanes and also in electric power generators, power tools, outboard motors, helicopters, lawn mowers, etc.

19 Claims, 38 Drawing Figures

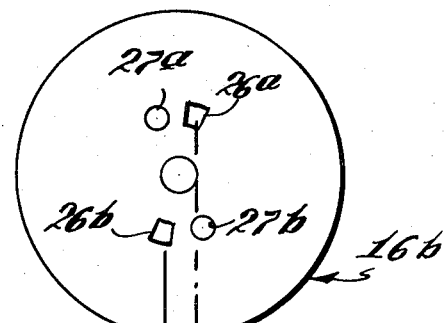
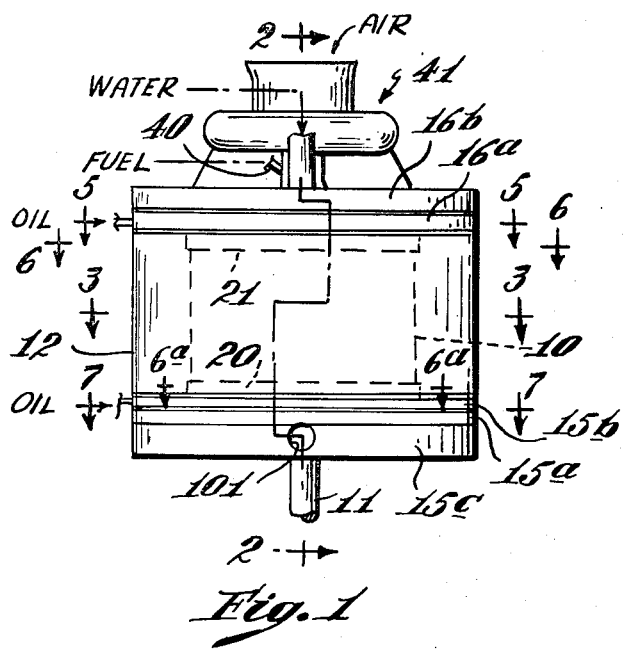
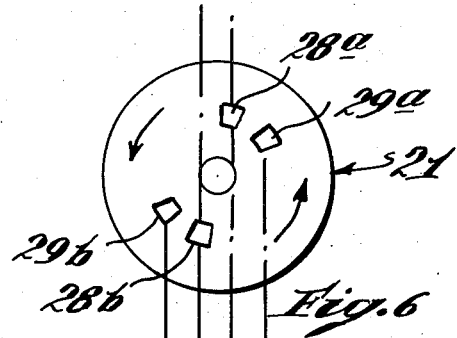
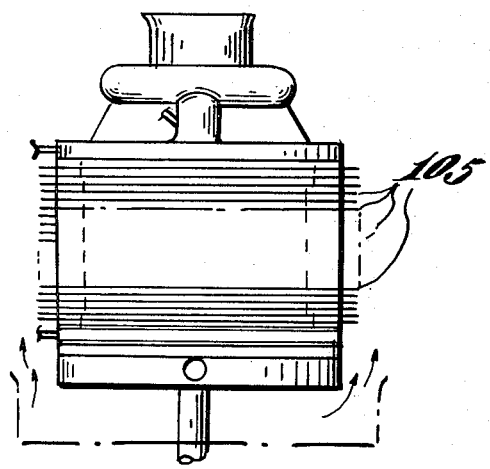
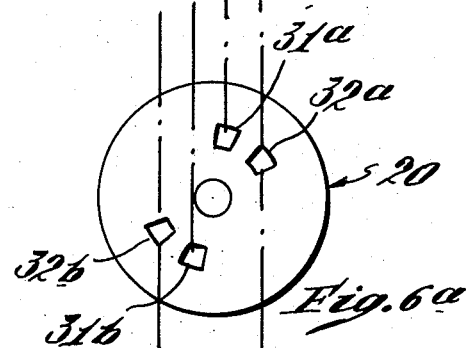
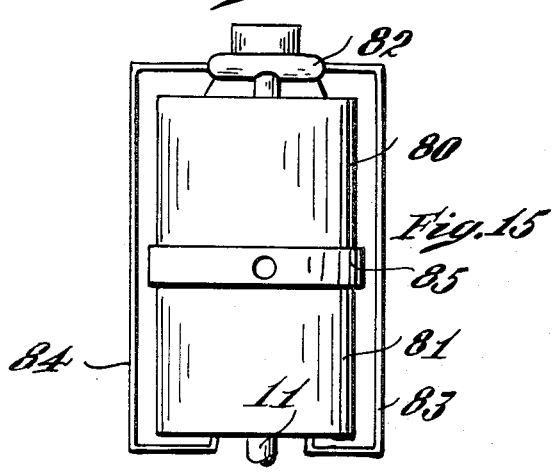
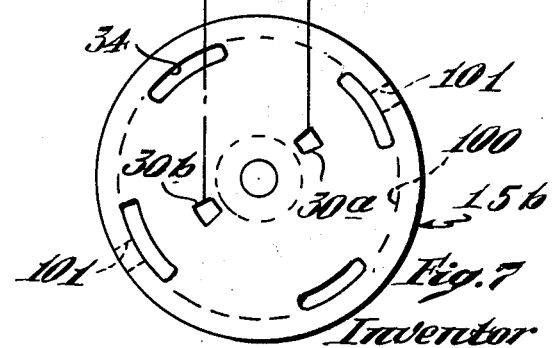

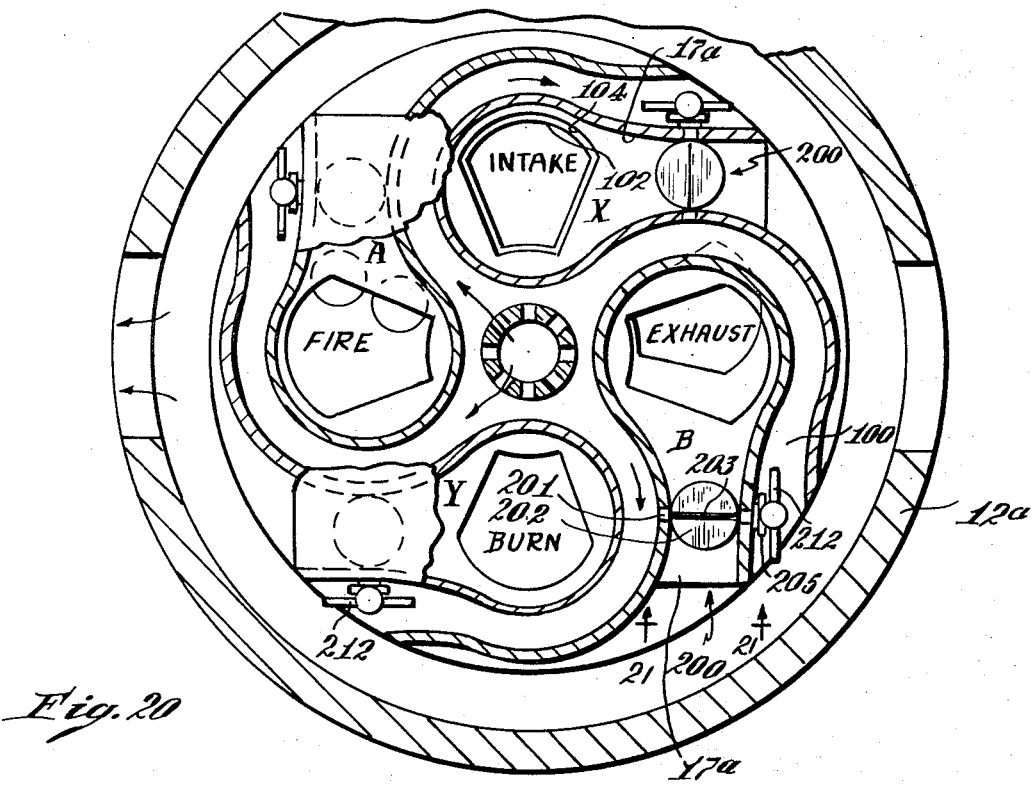
Fig. 20
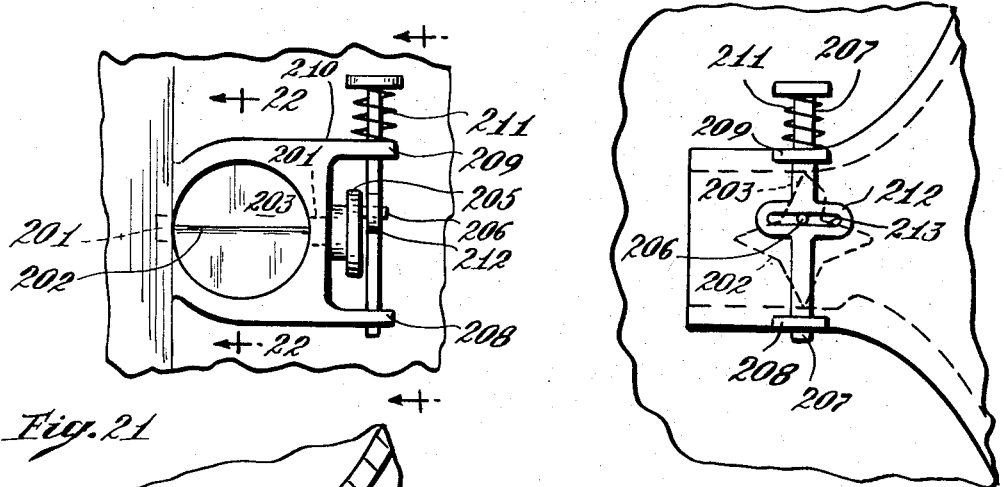
Fig. 21
Fig. 23
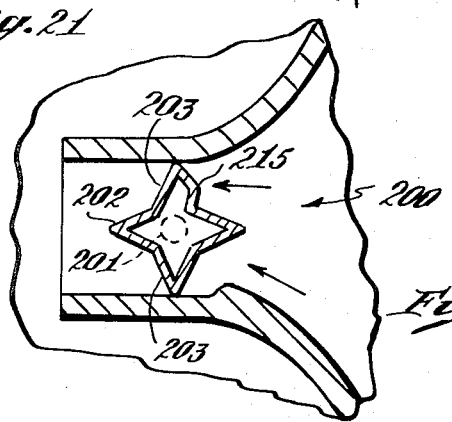
Fig. 22
Inventor
Antonio C. Mastrobuono
by Dike, Thompson & Bronstein
Att'ys

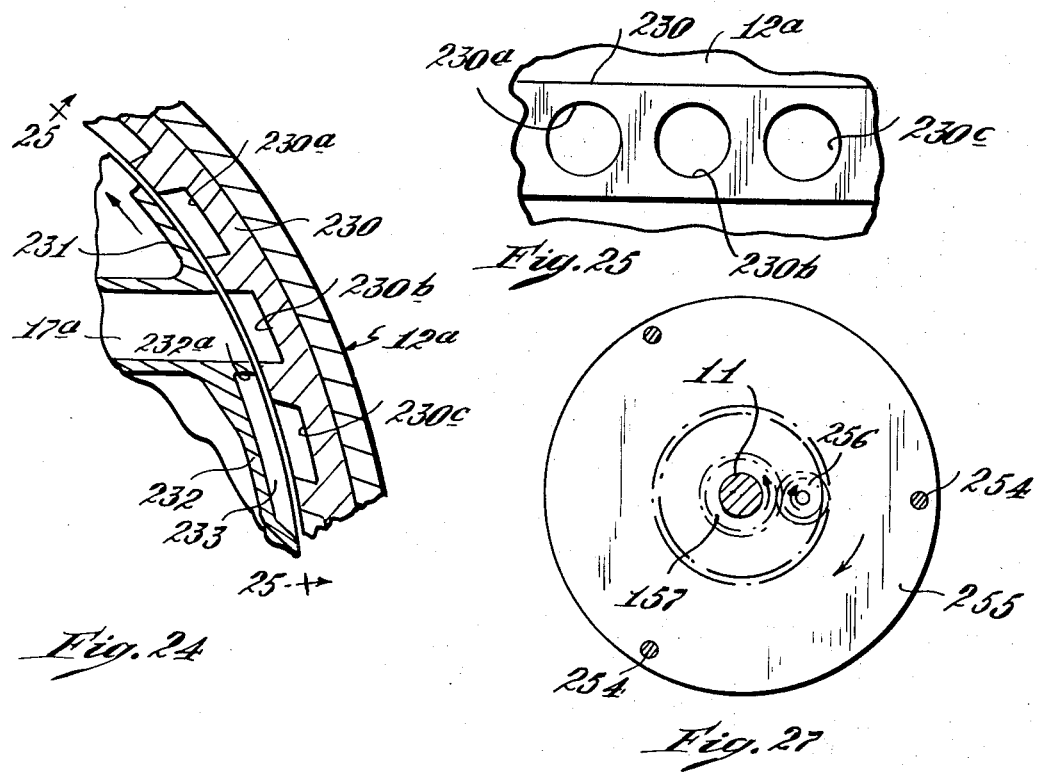
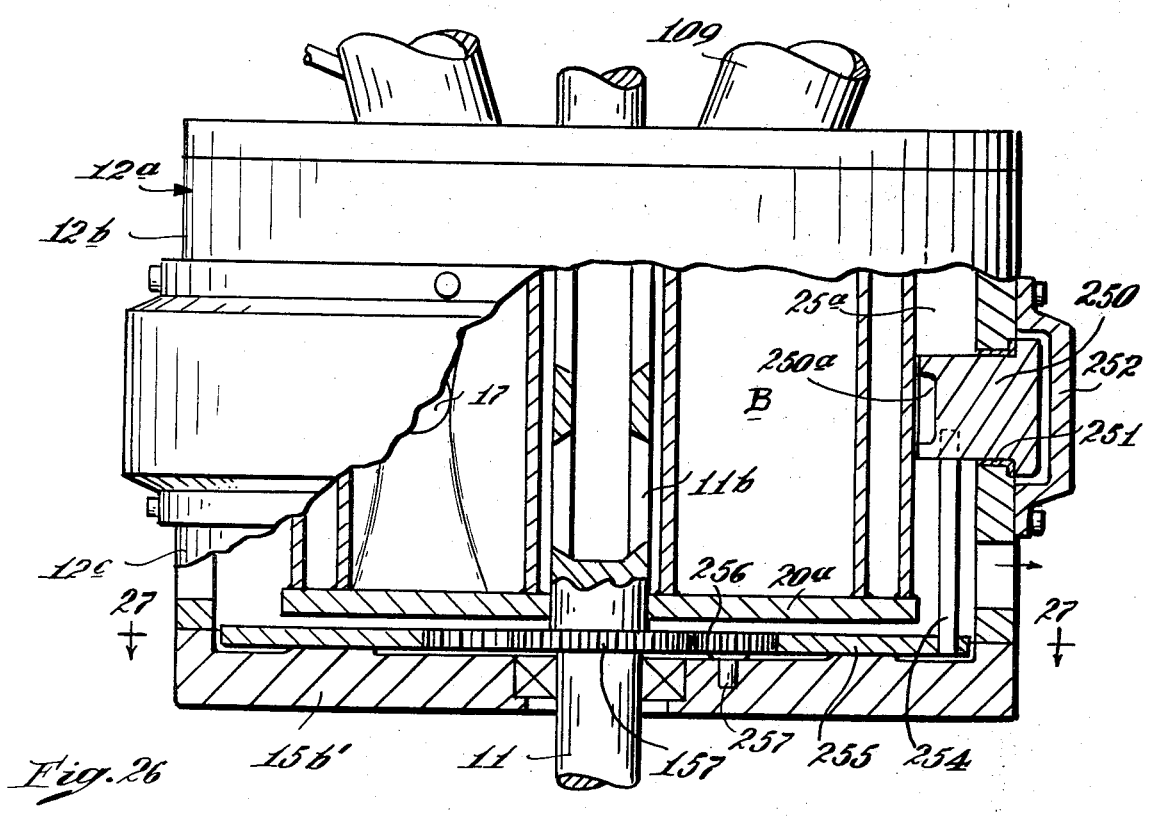

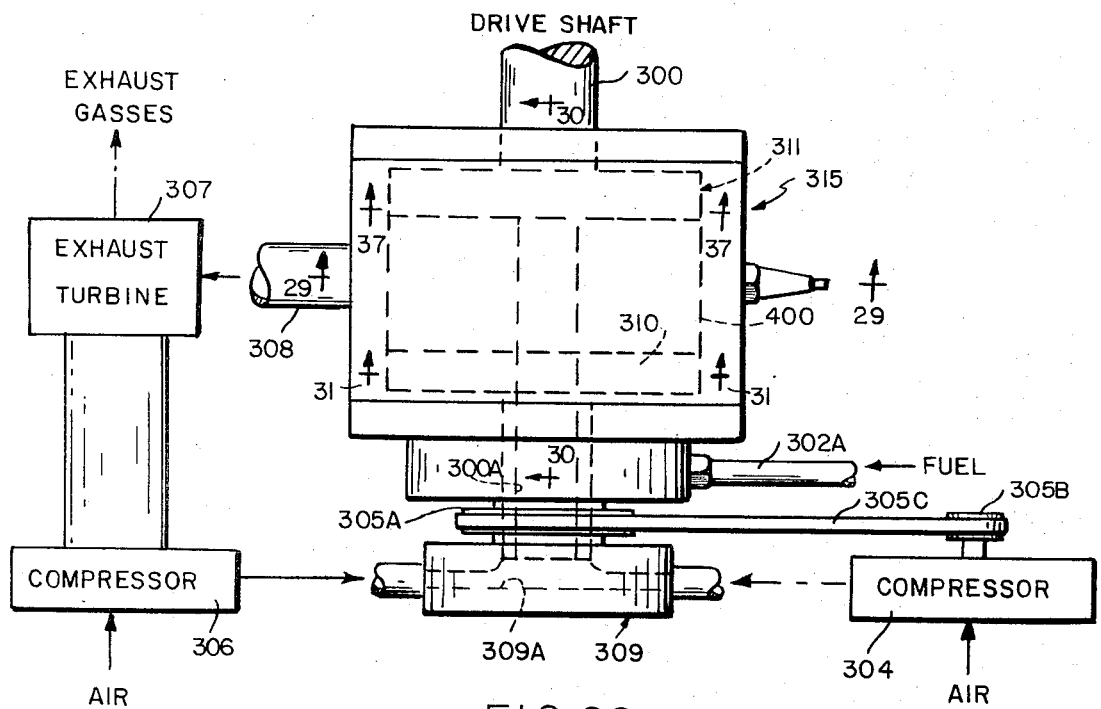
FIG.28
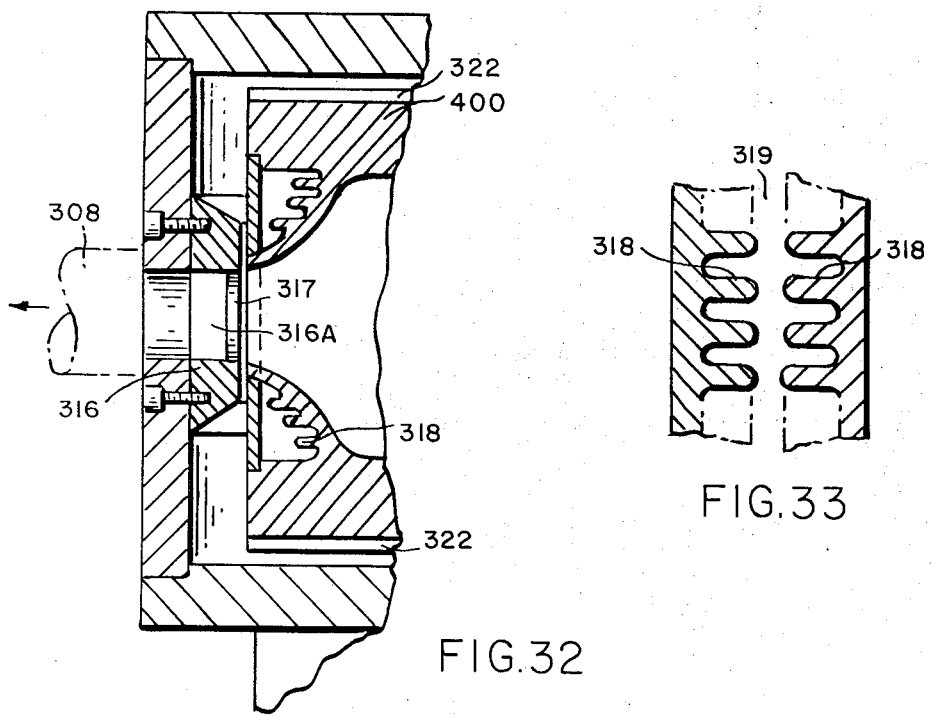
FIG.32
FIG.33

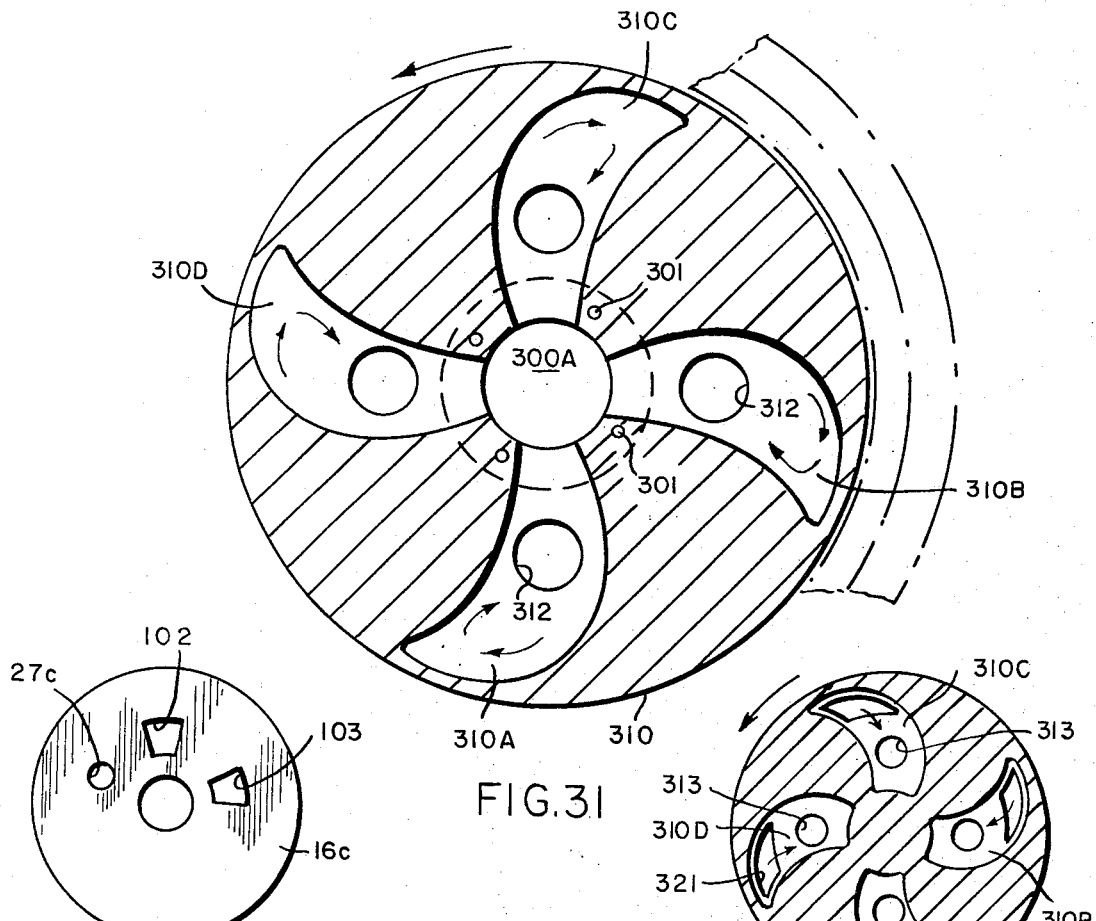
FIG.31
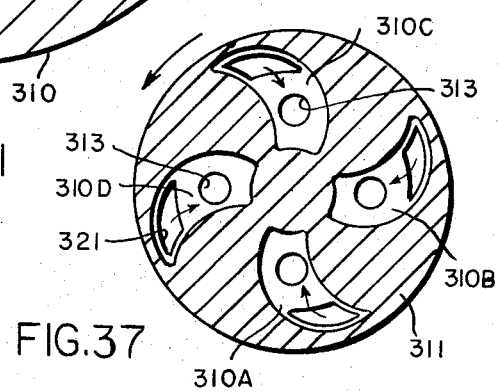
FIG.37
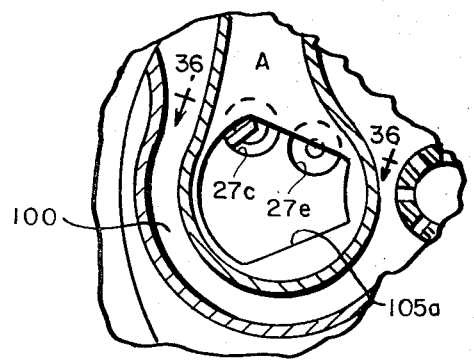
FIG.34
FIG.35
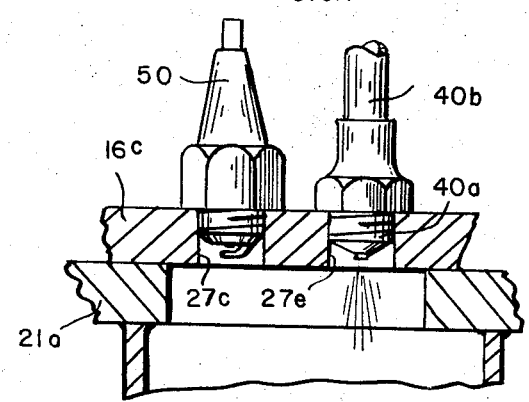
FIG.36

ROTARY TURBINE ENGINE

CROSS-REFERENCE TO RELATED APPLICATIONS

This application is a continuation-in-part of copending application Ser. No. 8,918 filed Feb. 5, 1970, now abandoned which was a continuation-in-part of application Ser. No. 870,615 filed Oct. 27, 1969, now abandoned, which was a continuation-in-part of application Ser. No. 812,667 filed Apr. 2, 1969, now abandoned.

BACKGROUND OF THE INVENTION

This invention relates to rotary turbine engines for use in vehicles such as automobiles, tractors, trains and also in electric power generators, power tools, outboard motors, helicopters, lawn mowers, etc.

Certain embodiments of rotary internal combustion engines have been suggested which include a drive shaft, a rotor integral with the drive shaft, the rotor comprising a plurality of expansion chambers, each expansion chamber having a nozzle projecting outwardly therefrom, a substantially cylindrical stationary casing surrounding the rotor, means for providing periodic intake of ignitable gas to the chambers, means for periodically igniting the gas in the chambers and means for causing periodic exhaust of residual gas from the chambers. In addition, means has been suggested for periodically closing the nozzles of a rotary internal combustion engine during each intake period and during each exhaust period. Furthermore, a rotary internal combustion engine has been suggested wherein the drive shaft is provided with an axial passage through which water is fed and from which the water is conducted to passages adjacent to the combustion chambers for cooling them. However these engines did not include the substantially arcuate combustion chamber walls nor a centrifugal air compressor driven at a substantially higher sped than the drive shaft as defined in the claims of this application.

The above-mentioned suggestions and others are disclosed in the following United States and foreign patents:

UNITED STATES

| Number | Date | Inventor or Patentee |
|---|---|---|
| 1,333,204 | March 9, 1920 | Eisele |
| 1,241,303 | Sept. 25, 1917 | Thayer |
| 3,089,307 | May 14, 1963 | Kollander |
| 3,145,533 | Aug. 25, 1964 | Ollinger |

UNITED KINGDOM

| 23,469 | Sept. 21, 1901 | Coleman |
|---|---|---|

ITALY

| 435,865 | May 25, 1948 | Buccierlli |
|---|---|---|

The above patents do not disclose some of the elements nor the combinations of elements which are used in the invention of this application and, to the best of my knowledge, the engines disclosed in them have not met with commercial acceptance.

One object of this invention is to provide a new and improved rotary turbine engine.

Another object is to provide a new and improved rotary turbine engine in which the fuel is injected continuously into a plurality of combustion chambers of the rotor.

A further object is to provide a new and improved rotary turbine engine which provides periodic intake of ignitable gas to the combustion chambers.

A still further object is to provide a new and improved rotary turbine engine in which one inside wall of each combustion chamber is of a novel configuration so that a maximum utilization of pressure per square inch of the expanding gases acting on the inside wall of the combustion chamber is attained.

Yet another object is to provide such a rotary turbine engine with a centrifugal air compressor which is driven by the drive shaft at a substantially higher speed than the drive shaft and means providing communication between said compressor and the combustion chambers for supercharging the combustion chambers, thereby insuring substantially complete combustion of the ignitable gases whereby pollution of the air by the otherwise unburned exhaust gases is reduced.

A further object is to provide such a rotary turbine engine with a turbocharger driven by the exhaust gases, a second centrifugal air compressor driven by the exhaust turbine of the turbocharger and with means providing communication between the compressed air emitted from said second compressor and the compressed air emitted from the first air compressor to aid in additionally supercharging the combustion chambers and to further reduce or eliminate pollution of the air by exhaust gases.

Another object is to provide such an engine with impeller means integral with the drive shaft and adjacent either to one side or to opposite sides of each combustion chamber having substantially radial cavities which communicate with a source of compressed air and also with the combustion chambers for supercharging the combustion chambers either from one side or from opposite sides, in the latter case to provide criss-cross feeding of compressed air.

Still another object is to provide arcuate walls of the combustion chambers which are spaced apart to provide passages to a plurality of fins projecting into said passages and means providing communication between said passages and a source of cool compressed air for cooling the walls of the combustion chambers.

Yet another object is to provide a plurality of fuel passages in the drive shaft, each fuel passage terminating at its inner end with an injector which communicates with a combustion chamber.

A further object is to provide new and efficient means for providing communication between the exit orifices of the nozzles of the combustion chambers and an exhaust means for causing the rotor to rotate.

Another object is to provide such a rotary turbine engine in which the axis of each nozzle is so oriented with respect to the axis of the drive shaft that the torque at the drive shaft may be increased by increasing the distance between the axis of each nozzle and the axis of the drive shaft.

Other objects and advantages of the invention will be apparent to persons skilled in the art and from the following description taken in conjunction with the accompanying drawings.

SUMMARY OF THE INVENTION

According to one aspect of the present invention, the rotary turbine engine includes a drive shaft and a rotor integral with the drive shaft, the rotor comprising a plurality of combustion chambers spaced radially with respect to the drive shaft. A substantially cylindrical stationary casing surrounds the rotor. Each combustion chamber comprises spaced end walls which are substantially normal to the axis of the drive shaft and also includes a nozzle extending outwardly from the chamber with its axis directed towards the peripheral wall of the casing. Each combustion chamber also comprises a substantially arcuate wall formed by a substantially arcuate plane which is generated about a line which is substantially at the intersection of a plane which coincides with the longitudinal axis of the nozzle and a plane which substantially coincides with a radius of the rotor which is substantially normal to the second plane. The engine also includes means for supercharging the combustion chamber comprising a centrifugal air compressor driven by the drive shaft at a substantially higher speed than the drive shaft and means for providing communication between the centrifugal air compressor and the combustion chambers for supercharging the combustion chamber. It also includes means for injecting ignitable gas to the combustion chambers and means for igniting the gas in the chambers to cause expansion thereof and the expanded gases to emerge from said nozzles thereby causing rotation of the rotor.

In one embodiment, the means for injecting ignitable gas to the combustion chambers comprises a plurality of fuel passages in the drive shaft, each fuel passage terminating at its inner end in an injector which communicates with a combustion chamber and its outer end with a pressurized fuel chamber which is formed in a member attached to the end wall of the casing, whereby ignitable gas is continuously injected into the combustion chambers.

In one embodiment, the drive shaft comprises an air passage communicating at one end with a centrifugal air compressor and the rotor includes first impeller means integral with the drive shaft and adjacent to one side of the combustion chambers, the impeller means comprising a plurality of cavities which extend generally radially outwardly from the air passage and ports affording communication between the cavities and the combustion chambers through one side of the combustion chambers. In another embodiment, the engine comprises second impeller means positioned adjacent to another side of the combustion chambers, the second impeller means including a plurality of generally radial cavities communicating with the drive shaft air passage and ports providing communication between the cavities and the combustion chambers through said another side of the combustion chambers, whereby cross supercharging of the compressed air admitted to each combustion chamber is effected by said ports which pass through different sides of each combustion chamber.

In one embodiment, at least portions of said substantially arcuate walls of the combustion chambers formed by the aforesaid substantially arcuate planes are spaced apart providing passages between adjacent walls of the combustion chambers which communicate with the drive shaft air passages. Ports are provided in the walls of the cavities of the second impeller means providing communication between the arcuate passages and the cavities of the second impeller means whereby the compressed air passes from said arcuate passages to said second impeller cavities and thence to the interiors of the combustion chambers.

In another embodiment, the outer faces of said substantially arcuate walls of the combustion chambers are provided with a plurality of fins which project into the passages between the arcuate walls so that the walls of the combustion chambers are cooled by the compressed air in the drive shaft air passage.

One preferred embodiment also includes a turbocharger exterior of the casing and means for providing communication between the exhaust gases which emerge from the nozzles of the combustion chambers and the exhaust turbine of the turbocharger. It also includes a second centrifugal air compressor driven by the exhaust turbine and means for providing communication between the second centrifugal air compressor and the compressed air emitted from the first centrifugal air compressor thereby to aid in additionally supercharging the combustion chambers. This embodiment also preferably includes an annular member attached to the peripheral wall of the casing, the annular member being formed with an annular passage between the peripheral wall and an inner wall of the annular member and the inner wall of the annular member is provided with a series of spaced ports for providing communication between the nozzles of the combustion chambers and the annular passage, whereby exhaust gases emerging from the nozzles periodically pass to the annular passage. It also includes means for affording communication between the annular passage and the exhuast turbocharger for continuously passing exhaust gases to the exhaust turbocharger.

In preferred embodiments, the axis of each nozzle is substantially perpendicular to a line which is perpendicular to the axis of the drive shaft and the nozzles point in different directions, so that a greater portion of the pressure produced by the combustion of the ignitable gas may be utilized by decreasing the diameter of the inner surface of the arcuate wall of the combustion chamber formed by the arcuate plane and increasing the width of the combustion chamber, whereby the volume of the combustion chamber remains unchanged and a maximum utilization of pressure per square inch acting on the inside arcuate wall of the combustion chamber is attained.

In preferred embodiments, the axis of each nozzle is substantially perpendicular to a line which is perpendicular to the axis of the drive shaft and the nozzles point in different directions, whereby torque at the drive shaft may be increased by increasing the distance from the axis of the drive shaft to the point of intersection between said axis of the nozzle and said perpendicular to the axis of the drive shaft.

One embodiment includes means for providing periodic intake of ignitable gas to the combustion chambers, means for periodically igniting the ignitable gas and means for causing periodic exhaust of residual gases from the combustion chambers through an exhaust passage.

In one embodiment, opposite sides of the combustion chambers are formed by end members, the outer faces of which comprise at least portions which are substantially perpendicular to the axis of the drive shaft and the portions of at least one of these end members comprise ports for periodically providing communication between the combustion chambers and the source of ignitable gas and the means for igniting the ignitable gas. In this embodiment, a portion of at least one of the end members comprises ports for periodically providing communication between the combustion chambers and an exhaust passage.

In one embodiment, at least a portion of one end of the substantially cylindrical casing engages portions of the end member of the combustion chambers which include intake and ignition ports and said portion of said casing end member comprises ports which successively provide communication between said intake and ignition ports in said portion of said end member of said combustion chamber.

In one embodiment, the engine also comprises means for periodically closing the nozzles and this means comprises means adjacent to the peripheral wall of the substantially cylindrical casing for forming a series of spaced pockets which are of substantially the same diameter as the diameter of the orifices of the nozzles and which face the orifices.

BRIEF DESCRIPTION OF THE DRAWINGS

FIG. 1 is a top plan view of an engine embodying this invention;

FIG. 5 is a section on the line 5—5 of FIG. 1;

FIG. 6 is a section on the line 6—6 of FIG. 1;

FIG. 6a is a section on the line 6a—6a of FIG. 1;

FIG. 7 is a section on the line 7—7 of FIG. 1;

FIG. 14 is a plan of an air-cooled engine;

FIG. 15 is a plan of two engines in unison with a common shaft;

FIG. 20 is a section like FIG. 18 but showing a different embodiment of means for closing the nozzles;

FIG. 21 is an elevation looking in the direction of the arrows 21—21 of FIG. 20;

FIG. 22 is a section taken on the lines 22—22 of FIG. 21;

FIG. 23 is an elevation looking in the direction of the arrows 23—23 of FIG. 21;

FIG. 24 is a partial section through a nozzle and the adjacent part of the casing showing a different embodiment of means for closing the nozzles;

FIG. 25 is an elevation looking in the direction of the arrows 25—25 of FIG. 24 and showing the nozzle closing means of FIG. 24;

FIG. 26 is a partial section like FIG. 19 showing another embodiment of means for closing the nozzles;

FIG. 27 is a reduced partial section on the lines 27-27 of FIG. 26;

FIG. 28 is a schematic view showing an embodiment of the invention in which fuel is continuously fed into the combustion chambers through passages in the drive shaft, a centrifugal air compressor driven by the drive shaft and an exhaust turbocharger driven by the exhaust gas and in which the compressed air of both is conveyed through a hollow passage in the drive shaft and thence to each of the combustion chambers;

FIG. 31 is an enlarged section on the line 31—31 of FIG. 28;

FIG. 32 is an enlarged partial section similar to FIG. 30 but in which a nozzle of a combustion chamber is communicating with the exhaust port.

FIG. 33 is an enlarged section on line 33—33 of FIG. 29;

FIG. 34 is a front elevational view of the inner face of the stationary disc 16c of FIG. 19 showing the intake and exhaust ports but only one ignition port.

FIG. 35 is a partial view of the combustion chamber A of FIG. 18 with an orifice for a nozzle for injecting fuel directly into the combustion chamber substituted for the spark plug orifice 27d of FIG. 18;

FIG. 36 is an enlarged section on the line 36—36 of FIG. 35; and

FIG. 37 is a reduced section on the line 37—37 of FIG. 28.

DETAILED DESCRIPTION OF THE EMBODIMENTS OF FIGS. 1 to 15

Figure 2:
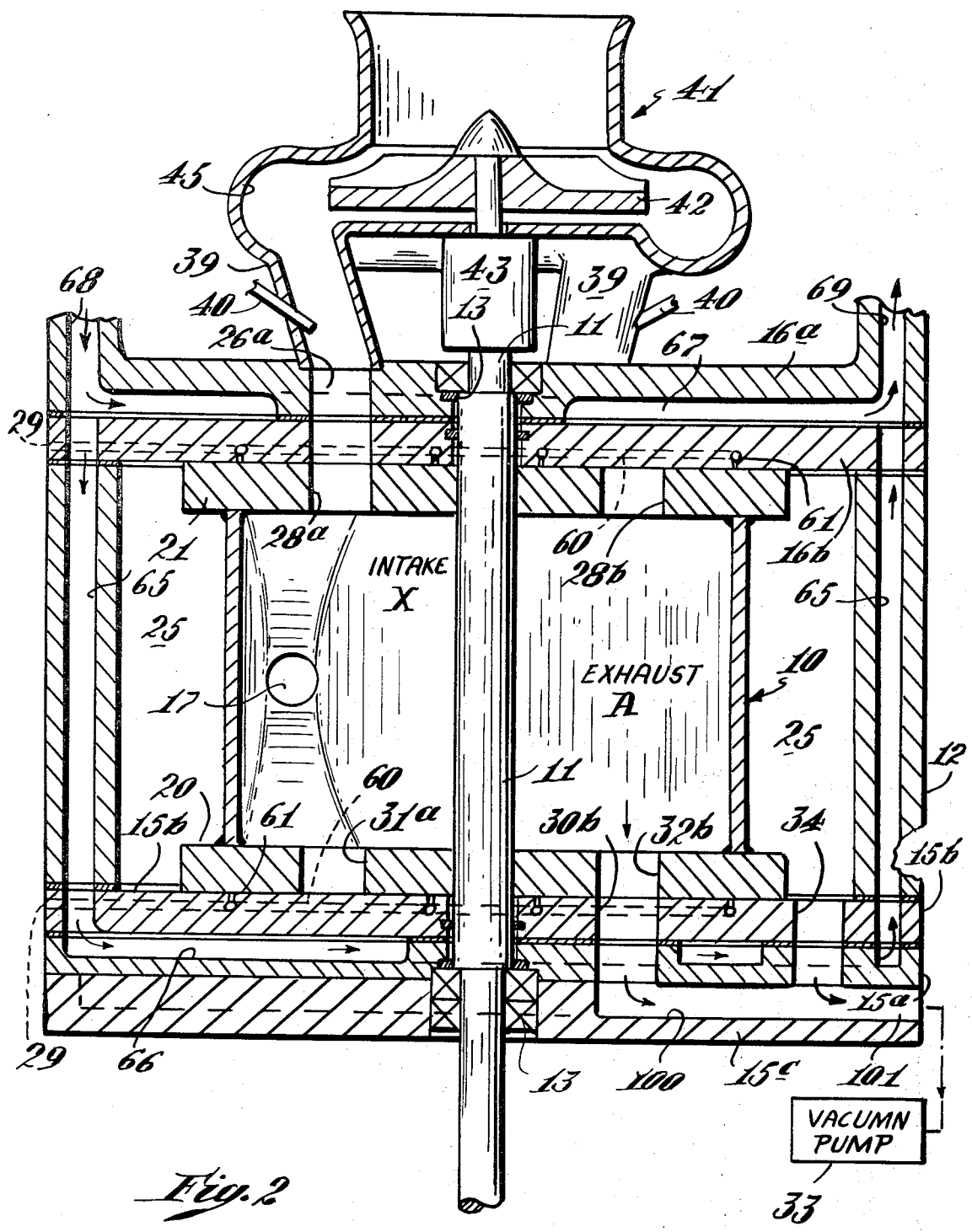
FIG. 2 is an enlarged section on the line 2—2 of FIG. 1, showing certain of the intake and exhaust ports in one position of the rotor, the cooling system and the lubricating system.
Figure 3:
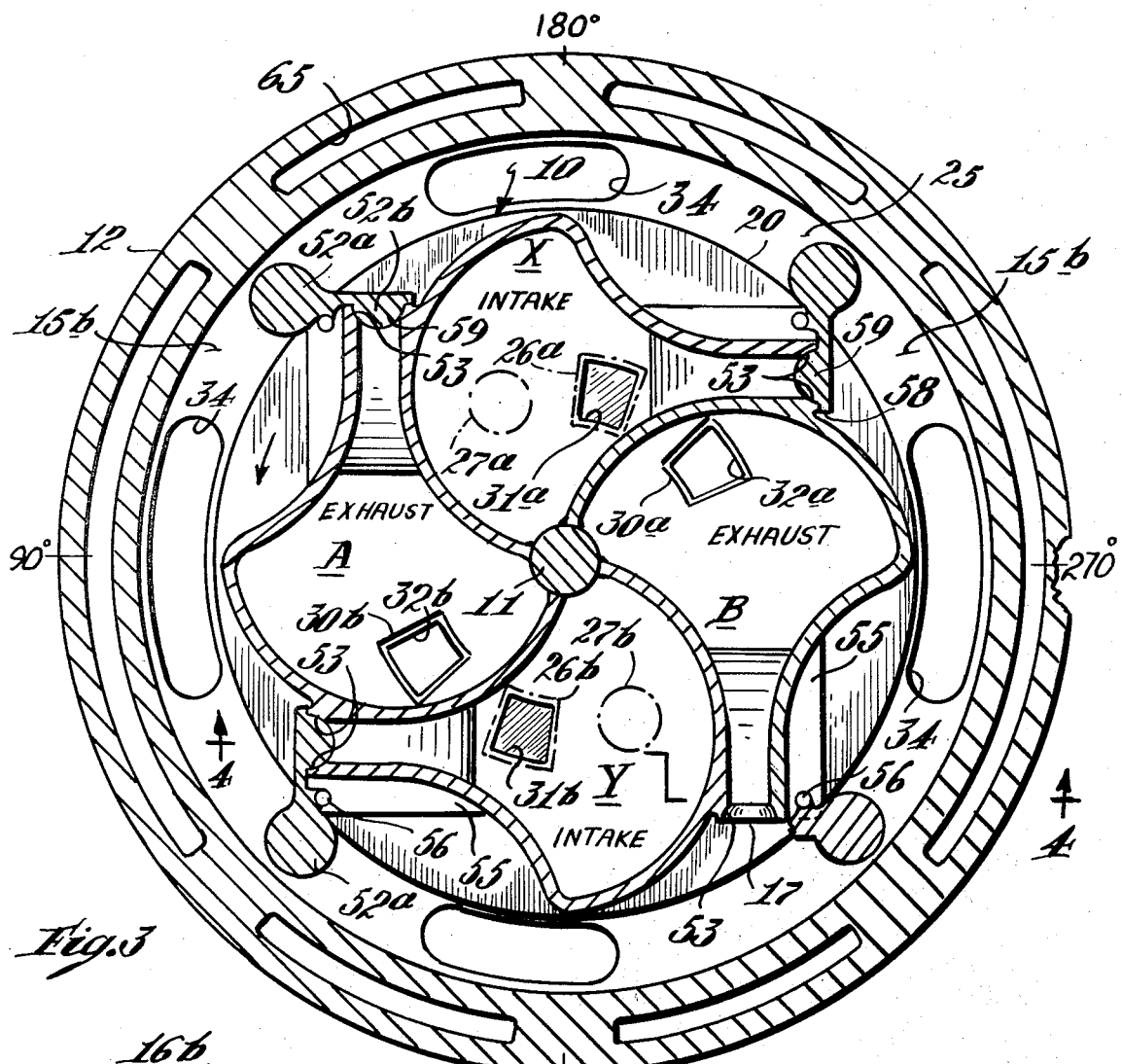
FIG. 3 is an enlarged section on the line 3—3 of FIG. 1, showing the outer stationary cylinder and the inner rotor containing four combustion chambers, the ignition and intake ports which are above the section lines being shown in phantom.

Referring to FIGS. 2 and 3, the rotor 10 which comprises four combustion chambers, A, B, X and Y, mounted on shaft 11 is housed in a suitable cylindrical casing 12 (FIG. 1). Shaft 11 is supported by bearings 13 (FIG. 2) provided at the centers of the discs, 15a, 15b, 15c and 16a, 16b of the cylindrical casing 12 (FIG. 2).

The combustion chambers, A, and B, X and Y, are provided with jet nozzles 17. The end flat walls of the combustion chambers are formed by two inner discs 20, 21 (FIGS. 1 and 2) which are smaller in diameter than the stationary end discs, 15a, 15b and 16a, 16b of the cylindrical casing and which engage the stationary discs 15b and 16b in a continuous circular face-to-face sliding manner when the rotor is rotated. To insure proper sealing and lubrication, the touching surfaces of these four discs have a smooth finish and they are constantly lubricated as will be described later. Chamber 25 (FIGS. 2 and 3) is formed between the combustion chambers A, B, X and Y, the discs 15b, 16b and the cylindrical wall of the casing 12.

The four combustion chambers A, B, X and Y provide two opposite pairs and the gas in said pairs is ignited at the same time so that they explode two at a time with the jet nozzles disposed in opposite directions and when the two jet streams of gas are ejected through the nozzles, there are equal and opposite reactions causing the rotor to turn counterclockwise, looking at FIG. 3. Since the four chambers are integral with the discs 20 and 21 and the shaft 11, these elements revolve as one unit.

Stationary discs 16a, 16b are provided with a pair of intake ports 26a, 26b and a pair of ignition ports 27a, 27b (FIGS. 5, 2 and 3) and rotating disc 21 is provided with four ports 28a, 28b and 29a, 29b (FIG. 6).

Stationary discs 15a, 15b are provided with a pair of exhaust ports 30a, 30b (FIGS. 7 and 3) and rotating disc 20 is provided with four exhaust ports 31a, 31b, 32a and 32b (FIGS. 6a and 2). Exhaust passage 100 is formed between discs 15a and 15c and communicates with vacuum pump 33 (FIGS. 2 and 7) through a pair of oppositely disposed passages 101. Exhaust passages 34 in stationary discs 15b, 15a afford communication between chamber 25 and exhaust passage 100 (FIGS. 2 and 3).

Precompressed fuel-air mixture is supplied to the intake ports 26a and 26b through passages 39 (FIG. 2). Compressed air is supplied by the centrifugal compressor 41, the rotor 42 of which is connected to the shaft 11 through a gear box 43 so that it may be timed to function at its highest capable efficiency with the highest designed efficiency of the engine. Compression of the air takes place in chamber 45 and fuel is injected by nozzles 40.

Figure 13:
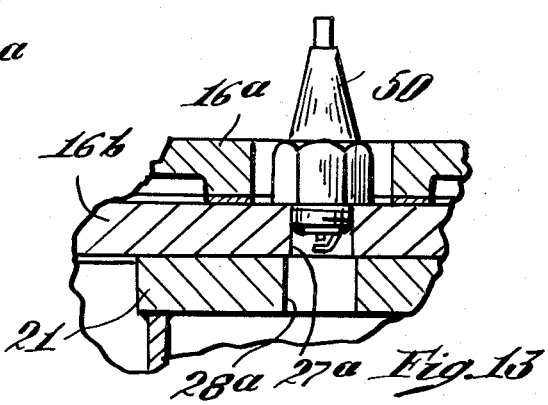
FIG. 13 is an enlarged section showing ignition ports and a spark plug.

Referring to FIG. 13, spark plugs 50 are mounted in the ignition ports 27a and 27b of stationary discs 16a and 16b.

FIG. 3 shows in phantom intake ports 26a, 26b registering with intake ports 31a, 31b in chambers X and Y and exhaust ports 32a, 32b registering with exhaust ports 30a and 30b in chambers A and B. Ports shown in FIG. 3 in chamber X are perforated through the walls of stationary discs 16a, 16b, rotating disc 21 and rotating disc 20, as also shown in FIG. 2. These ports are 26a of FIG. 5, 28a of FIG. 6 and 31a of FIG. 6a. Port 31a, being on the rotary disc 20, serves the function of an exhaust port but is shown blocked in FIG. 3. Ports 26a and 28a serve the function of intake when in the position of FIG. 2. These ports when registering as shown in FIG. 3 occupy about 20° from about 185° to about 205° as shown in FIG. 3.

Ports shown in chamber Y, FIG. 3, are also perforated through the walls of stationary discs 16a, 16b, rotary disc 21 and rotary disc 20. These are ports 26b of FIG. 5, 28b of FIG. 6, and 31b of FIG. 6a. Port 31b, being in the rotary disc 20, serves the function of exhaust but is shown blocked in FIG. 3. Ports 26b and 31b serve the function of intake when disc 21 is in the position shown in FIG. 3. These ports occupy about 20° from about 5° to about 25° as shown in FIG. 3.

These ports are preferably equal in size, opposite each other, equidistant from the axis of the drive shaft 11, and located at approximately a mid-point between this axis and the circumference of the rotary discs 20 and 21.

Ports shown in chamber A registering in FIG. 3 are two exhaust ports 30b of discs 15a, 15b and 32b of rotary disc 20 (FIGS. 2, 6a and 7). These ports will occupy about 20° from about 45° to about 65°.

Ports shown in chamber B registering in FIG. 3 are two exhaust ports, 30a of stationary discs 15a, 15b and 32a of rotary disc 20 (FIGS. 6 and 7). These ports will occupy about 20° from about 225° to about 245°.

These ports are also opposite to each other, preferably equal in size to the intake ports and placed at the same distance from the axis of the shaft 11 as the intake ports as shown in FIG. 3.

The ignition ports 27a and 27b in which the spark plugs are mounted are at the same distance from the axis of the shaft 11 as the intake and exhaust ports. Referring to FIG. 3, the port 27a for chamber X preferably occupies 20° from about 140° to about 160° and the port 27b for chamber Y occupies 20° from about 350° to about 340°.

It is understood, however, that in designing an engine of this type for particular, pre-desired performance, the intake ports, exhaust ports and ignition ports, may be placed either closer towards or farther away from the axis of the shaft. It is common knowledge that a point on a rotating disc which is close to its axis, travels a shorter distance than a point on the circumference. For this reason, if the ports are placed closer to the axis, they would normally be smaller in size. If, on the other hand, they are placed farther away from the axis, they would normally be larger in size to provide the proper areas for intake and exhaust. The basic principle of the relationship which governs the relative distances between these ports, looking at FIG. 3, is that the angles subtended at the center of the discs by the intake, exhaust and ignition ports are identical to the angles subtended by the distances between them, because the cycle of operation — intaking, firing, expansion and exhaust — depends on it. In other words, it is precisely the relative distance between the intake and the exhaust ports that regulates the opening and closing of the ports at the proper times. However, these ports may be closer together in degrees so that the exhaust ports will completely close only after the intake ports have opened a fraction of their width in degrees. This arrangement permits the scavenging of the burned gas from the combustion chambers by incoming air just like the deflector of a piston of a two cycle engine. If this arrangement is used, then only compressed air should be forced through the intake ports and the fuel should be sprayed into the combustion chambers after the intake ports are closed. Injectors may be placed on the disc 16a, 16 b just before the ignition ports 27a and 27b to provide the fuel.

To improve ignition, two additional spark plugs may be provided. This may be done by adding ignition ports in the stationary disc 16b and mounting spark plugs therein.

The rotor 10 may be provided with only two combustion chambers on the shaft 11 with their nozzles opposed rather than with four chambers as shown. This construction permits the use of chambers which are greater in volume, the use of larger intake and exhaust ports and better timing.

Figure 4:
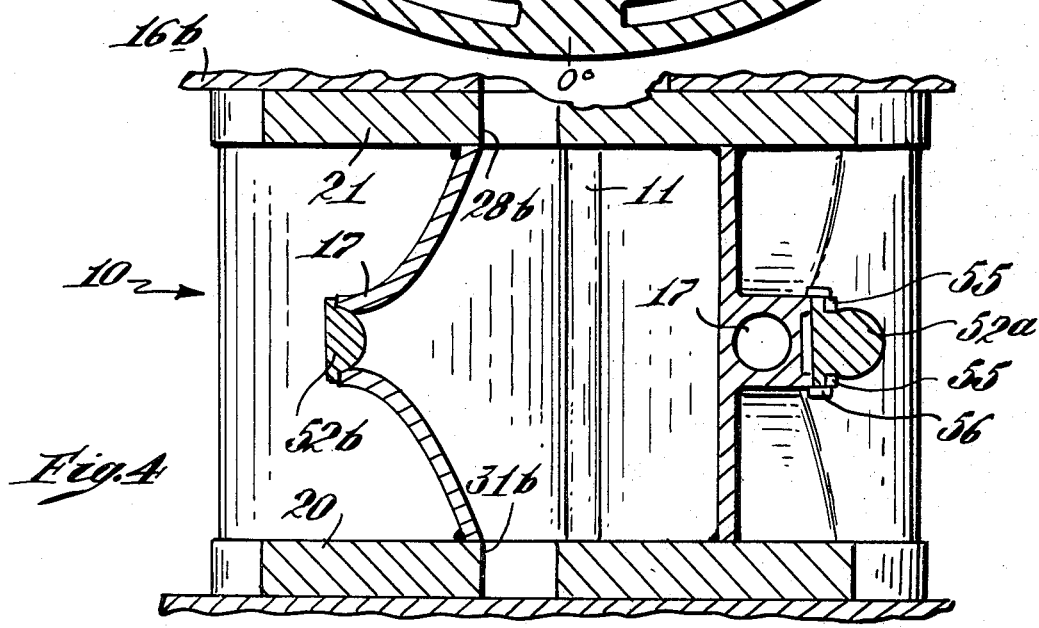
FIG. 4 is a section on the line 4—4 of FIG. 3.

As shown in FIGS. 3 and 4, elements 52a, 52b are provided to open and close the orifices of the jet nozzles 17. The inner lip at the extremity of each jet nozzle is provided with a recesses cavity 53, concave in shape. The arms 52a and 52b are arranged at an angle of about 180° (or any other suitable angle) from each other and the element is mounted for pivotal movement by bolts 56 which extend through the lugs or projections 55 provided on the outer wall of each nozzle. Element 52a is a solid partial sphere. Element 52b comprises a disclike front portions 58, slightly greater in diameter than the diameter of the nozzle from outer lip to outer lip, and a semi-spherical element 59. Element 59 fits the concave cavity 53 of the nozzle providing a tight seal when closed. This element 52a/52b works on the principle of centrifugal force, and the bolt 56 on which it rotates is of high tensile strength in order to support the strain caused by the maximum r.p.m. of the rotor. The weight of the element 52a is greater than the weight of 52b and consequently as the chambers rotate in a counterclockwise direction (looking at FIGS. 3 and 8 through 12) during the interval of exhaust, when there is no jet stream coming out of the nozzle, centrifugal force, acting upon 52a causes it to move in a clockwise direction about the bolt 22 and element 52b closes the nozzle. It remains closed during both exhaust and intake and until the moment of ignition when the expanding gases push it open and keep it open through the phase of expansion. Consequently, this element 52a, 52b prevents the escape of the fresh air-fuel mixture during intake and insures proper compression by the centrifugal compressor up until the moment of ignition. Since the ratio of the weight of 52a to 52b remains unchanged, the forces required to open and close this element 52a, 52b remain unchanged although the centrifugal force acting upon it increases as the r.p.m. of the rotor increases.

Therefore, the closing force of the element 52a will always be slightly greater at any idling speed than the pressure of the fuel-air mixture against the semi-spherical element 59 throughout the phase of intake and up until ignition.

The system for lubricating the adjacent faces of rotating discs 20, 21 and stationary discs 15b and 16b consists of radial passages 60 having ducts 61 which lead to said faces (FIG. 2). The radial passages communicate with an oil supply line 29 to which oil is supplied under pressure from a pump and reservoir (not shown). Consequently, a thin film of oil is maintained between the faces of said discs to insure a relatively friction free, circular sliding motion.

The water cooling system (FIGS. 2 and 3) consists of passages 65 formed in the wall of the casing 12, radial passages 66, 67, formed between the adjacent faces of discs 15a, 15b, and 16a, 16b respectively, an inlet passage 68 and an outlet passage 69. Cold water is forced by a pump (not shown) to passage 68 and the hot water is conducted by passage 69 to a radiator (not shown).

The cycle of operation is best shown in FIGS. 8 to 12.

Figure 8:
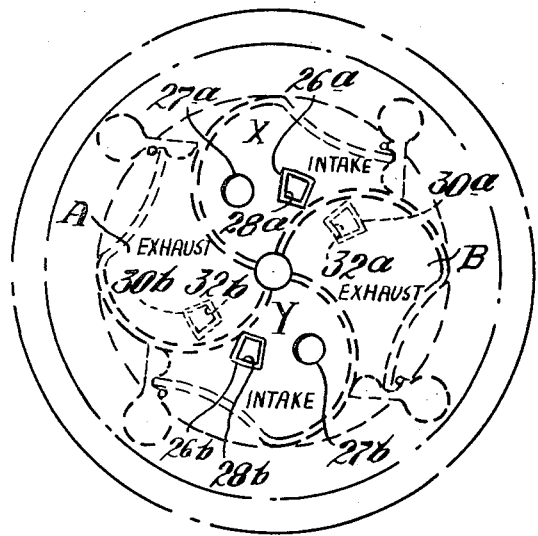
FIGS. 8 to 12 inclusive, are diagrammatic elevation views showing the rotating chambers in working cycle.

FIG. 8 shows chambers X and Y at the peak of intaking and chambers A and B at the peak of exhausting. At this time, the nozzles of X and Y are closed by the closure element 53 and the nozzles of A and B are closing.

In FIG. 8, intake ports 28a and 28b are registering with intake ports 26a and 26b and exhaust ports 32a and 32b are registering with exhaust ports 30a and 30b.

Figure 9:
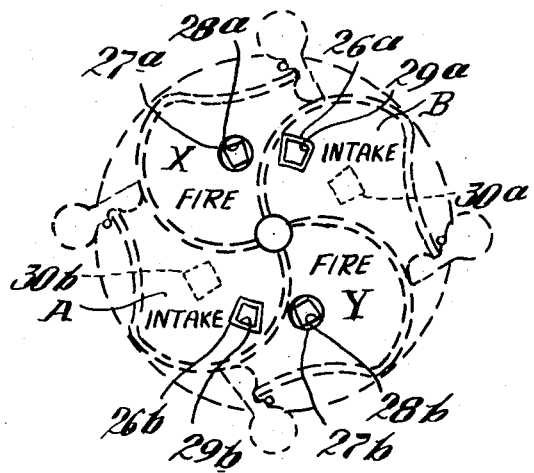

As the chambers rotate in a counterclockwise direction to the position of FIG. 9, intake ports 28a and 28b register with ignition ports 27a and 27b, the spark plugs are energized and the air-fuel mixture in chambers X and Y is ignited. In FIG. 9, chambers A and B are intaking and the intake ports 29a and 29b have been advanced to register with intake ports 26a and 26b.

Figure 10:
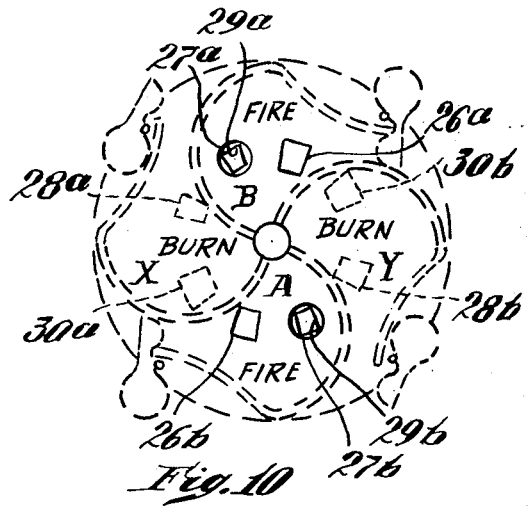

FIG. 10 shows chambers X and Y in position where rapid streams of burning-expanding gas have pushed open the closures for the nozzles and the jet streams of expanding gas from the nozzle from chamber Y continue to impinge upon the wall of the chamber 25 from about 340° to about 240° of latitude and the jet stream from chamber X impinges upon the wall of chamber 25 from about 165° to about 65° of latitude looking at FIG. 10. At this time, chambers A and B are firing, intake ports 29a and 29b being in registry with ignition ports 27a and 27b.

Figure 11:
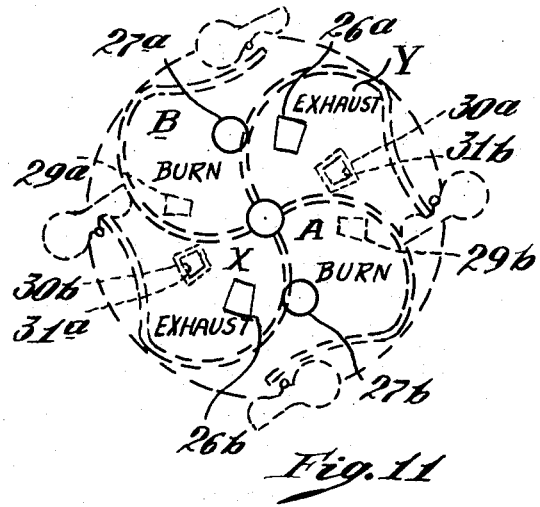

In FIG. 11, expanding and burning jets are being ejected from nozzles of chambers A and B and chambers X and Y are now exhausting through the end discs 20 and 15a/15b.

Figure 12:
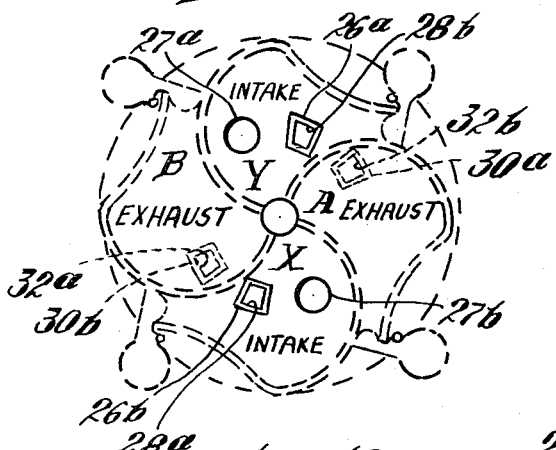

In FIG. 12, chambers X and Y are intaking and chambers A and B are exhausting. At this point, four explosions have occurred but the cycle of operation for one revolution is not completed because the chambers have only turned 180° in a counterclockwise direction. During the next 180° of revolution of the rotor, four more explosions occur so that, in one complete revolution, each of the four chambers explodes twice and thus there are a total of eight explosions per one complete revolution.

The engine may be air cooled as is shown in FIG. 14. In this construction, the stationary discs 15a and 16a may be eliminated and cooling fins 105 are added on the casing 12.

As shown in FIG. 15, the engine may be constructed to have two rotors 80, 81 with four combustion chambers for each. In this case, since one chamber explodes twice for each revolution, the engine has sixteen explosions for each revolution.

The first rotor, looking from top to bottom at FIG. 15, rotates counterclockwise and has intake, exhaust and ignition ports functioning as described for the first embodiment, that is, exhaust: intake: expansion - exhaust: intake: expansion, in the direction of counterclockwise rotation. However, the second rotor rotates in a clockwise direction looking from bottom to top at FIG. 15 and the combustion chambers are inverted so that their nozzles point in the same direction as the nozzles of the first rotor. Consequently, with the second rotor viewed from bottom to top looking at FIG. 15, the intake and exhaust ports function in the order of exhaust: intake: expansion - exhaust: intake: expansion, in the direction of motion, that is, clockwise.

DETAILED DESCRIPTION OF THE EMBODIMENT OF FIGS. 16 AND 17

Figures 16, 17:
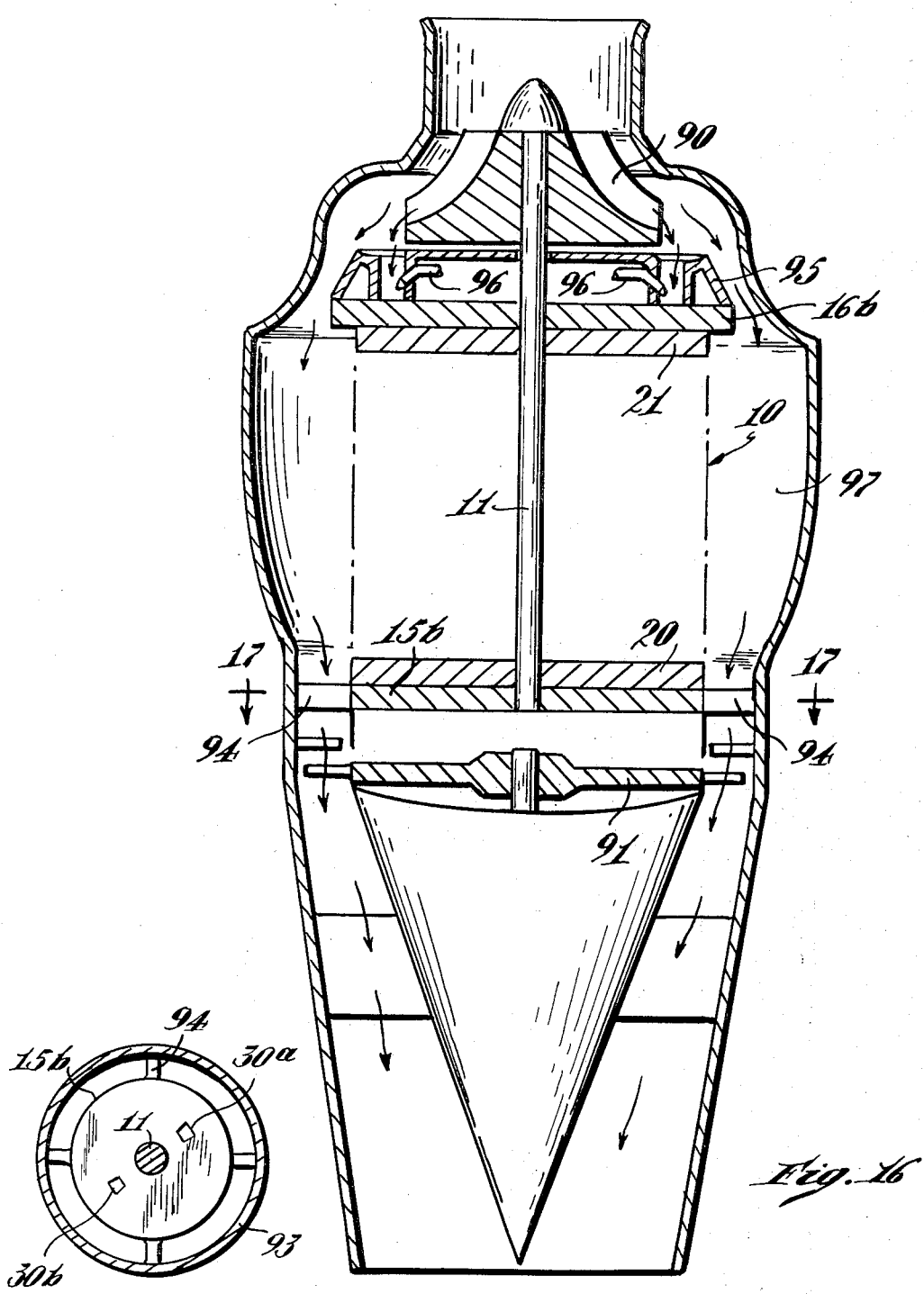
FIG. 16 is a longitudinal section of an airplane type engine.
FIG. 17 is a reduced section on the line 17—17 of FIG. 16.

In the arrangement shown in FIGS. 16 and 17, the stationary combustion chambers of a jet turbine engine are replaced by the rotor 10 of my engine. In this arrangement, the chambers of the rotor 10 are dynamic, the pulse is intermittent, and the maximum range of temperatures is utilized in the rotating chambers to run compressor 90 since they share common shaft 11. The bladed rotor 91 is not attached to shaft 11. This means that all the power at the turbine rotor 91 is utilized for net useful work, unlike the classic jet rotor from which power is absorbed to run the compressor.

The stationary disc 15b is attached to the casing 93 by four arms 94. The stationary disc 16b is attached to the casing 93 by an annular flange 95. The fuel is injected by nozzles 96.

Rotary discs 21 and 20 are attached to the shaft 11 and support the expansion chambers (not shown) in the same manner as in the first embodiment.

The exhaust gases from the jet nozzles expand into chamber 97 and mix with the cold air coming from the compressor. The cold air reduces the temperature of the exhaust gases so that the resultant temperature does not deform the rotor 91. This arrangement results in a considerable net gain in power and a substantial reduction in fuel combustion.

DETAILED DESCRIPTION OF THE EMBODIMENT OF FIGS. 18, 19, 34, 35 & 36

Figure 18:
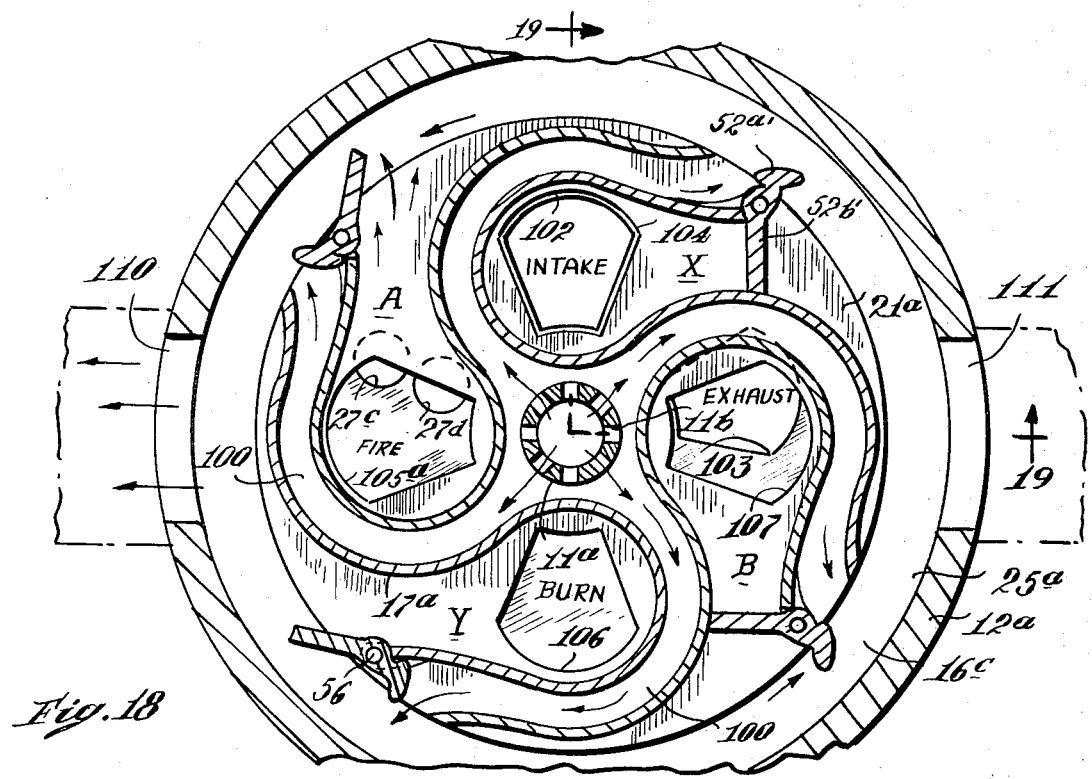
FIG. 18 is a section view of another embodiment of an engine embodying this invention, this view being similar to FIG. 3 but looking in the opposite direction to the line 3—3 of FIG. 1.
Figure 19:
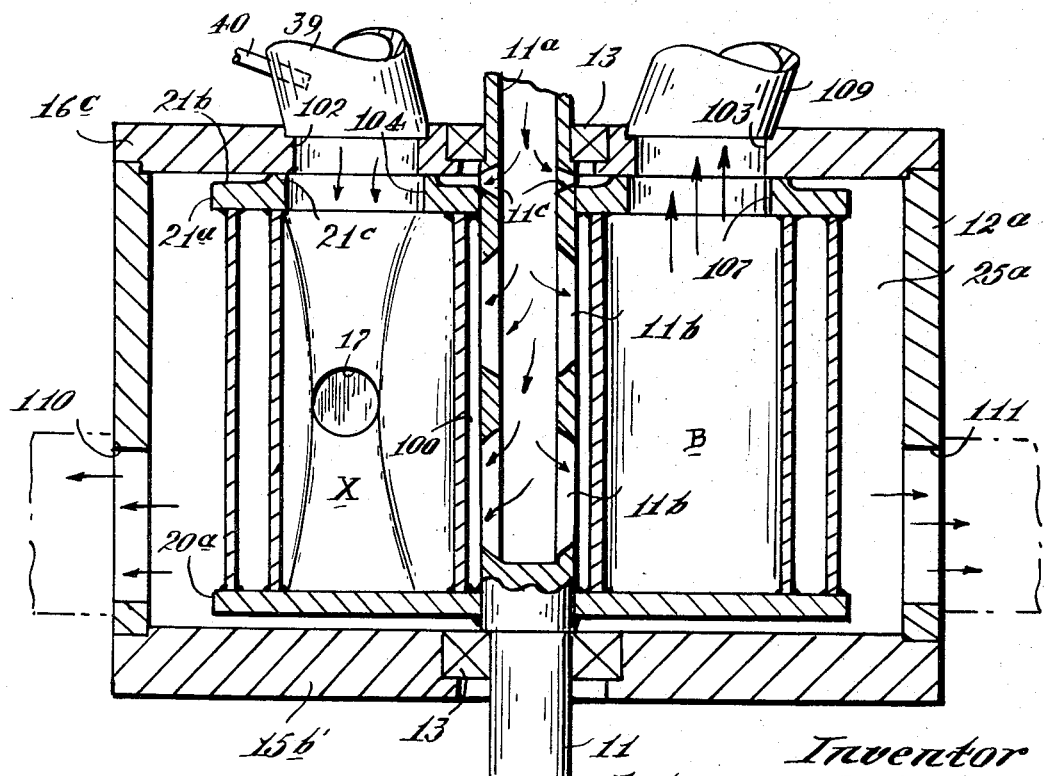
FIG. 19 is a section on the line 19—19 of FIG. 18.

Another embodiment of a rotary turbine engine embodying this invention is shown in FIGS. 18 and 19 of the drawings.

In this embodiment, the walls of the combustion chambers A, B, X and Y and of their nozzles 17a are more smoothly curved than in the embodiment of FIGS. 1 to 14 and they offer less resistance to the flow of expanding gas. Consequently, the loss of power due to friction of the expanding gas as it passes outwardly through each nozzle is reduced substantially if not eliminated.

For reasons to be explained in detail below, the walls of the combustion chambers are separated by passages 100 and the drive shaft 11 is provided with a hollow section 11a which has radial passages 11b affording communication between the axial passage of the hollow section 11a and the passages 100.

The rotary discs 20a and 21a are also different from the discs 20 and 21 respectively of the first embodiment. The rotary disc 20a is devoid of ports and it is spaced from the stationary disc 15b' of the cylindrical casing 12a as shown in FIG. 19, thus eliminating the necessity of lubrication of the adjacent faces of these discs.

Outer portions of the rotary disc 21a are machined away at the areas 21b so that only the outer face of the ring-like portion 21c in which the ports 104, 105a, 106 and 107 are formed engages the stationary disc 16c during rotation of the rotor.

This reduces the areas of the rotary disc 21a and the stationary disc 16c which must be lubricated. Radial passages 11c (FIG. 19) in the hollow section 11a of the drive shaft afford communication between its axial passage and the inner space between the face of stationary disc 16c and the face of the rotary disc 21a formed by machining the rotary disc away at 21b.

The stationary disc 16c is provided with an intake port 102, an exhaust port 103 and a pair of ignition ports 27c and 27d. While two ignition ports are shown in FIG. 18 to accomodate two spark plugs, only one spark plug and only one ignition port 27c may be used as shown in FIG. 34.

Preferably, the intake and exhaust ports 102 and 103 are of the same size as the ports 104, 105a, 106 and 107 of the rotary disc 21b and it will be observed that they are considerably larger than the corresponding ports of the first embodiment.

Pre-compressed fuel-air mixture is supplied to the intake port 102 through passage 39 from a centrifugal compressor (not shown) similar to the compressor 41 of the first embodiment and the rotor of the compressor may be driven by the shaft 11a through a gear box (not shown).

The tube 109 communicates with the exhaust port 103 and serves to conduct away the exhaust gases.

Because the intake ports are so large, there is ample time to charge each combustion chamber with a fresh fuel-air mixture at the high speed of rotation which is attained by the rotor.

In the position of the rotor shown in FIG. 18, the intake port 102 of the stationary disc 16c is registering with the port 104 of the rotary disc 21a and the ignition ports 27c and 27d of the stationary disc are partially registering with the port 105a of the rotary disc. The exhaust port 103 of the stationary disc is also partially registering with the port 107 of the rotary disc. The port 106 is not registering with any port in the stationary disc 16c.

The rotor is turning in a counterclockwise direction in FIG. 18 and the gas in chamber A is firing, the gas in chamber Y is burning, the gas in chamber B has started to exhaust and chamber X is in full intake position.

Thus in this embodiment, each port in the rotary disc 21a serves successively as an intake, an ignition and an exhaust port and the combustion chambers fire one at a time and consecutively.

Lubrication of the relatively small areas of the disc 16c and 21a which are in contact when the rotor is in operation is accomplished by mixing lubricating oil with the fuel and this air-fuel-lubricating oil mixture is always in contact with the portion 21c of the rotary disc except during the brief intervals when the port 102 is in exact registry with one of the ports 104, 105a, 106 or 107. Alternatively, lubrication of the face of 21c may be provided by lubrication systems of the type shown in FIG. 2.

In this embodiment, cooling is accomplished by forcing cool fresh air from the centrifugal compressor through the axial passage of the hollow portion 11a of the drive shaft. This cool air passes outwardly through the radial passages 11c and 11b of 11a into the space adjacent to 21b, the passages 100 and the chamber 25a and then outwardly through ports 110 and 111 in the cylindrical wall 12a.

The elements 52a' of the closure means for the nozzles 17a are eliptical as shown in FIG. 18 rather than spherical as in the first embodiment so they will present a minimum of frictional resistance to the air as it is forced outwardly through the outer portions of the passages 100.

The fresh air forced through the passages 100 and the chamber 25a extracts heat from the walls of the combustion chambers, from the elements 52a and from the rotary discs 20a and 21a and cools them. Furthermore, because the outlets of the passages 100 in effect form four more jet nozzles, the air which is expelled from them helps to rotate the rotor and increases the efficiency of the engine.

The efficiency of the engine may be greatly improved by introducing through the axial passage of the hollow portion 11a of the drive shaft a jet of water spray together with a jet of cool fresh air. When this mixture of cool fresh air and water spray introduced under pressure passes through the passages 100, it contacts the walls of the combustion chambers, extracts heat from them, becomes steam and forms four more jets of power which help rotate the rotor with increased force. Heat which would otherwise be simply wasted during cooling of the engine is thus used to create a useful new force for rotating the rotor. Thus the engine of this embodiment is a rotary turbine jet and steam engine.

The water for creating the jet of water spray is drawn from a water tank (not shown) of a thermox water heater type in order to prevent freezing of the water during cold seasons.

In the embodiment shown in FIGS. 35 and 36 only one ignition port 27c is provided in the stationary disc 16c to receive the spark plug 50, and an injection port 27e is provided in the disc 16c to receive the nozzle 40a of the fuel line 40b. Thus in this embodiment, the fuel is injected directly into the combustion chambers rather than being injected into the compressed air in the passage 39 which leads from the centrifugal compressor 41 to the intake port as shown in FIGS. 2 and 19.

DETAILED DESCRIPTION OF THE EMBODIMENT OF FIGS. 20 to 23

In the embodiments described above, the highest torque is created by each nozzle when the gas is ignited and first comes out of the nozzle and the torque diminishes as the combustion chamber moves from its fire to exhaust positions.

According to this embodiment, the means for closing the nozzle is constructed and arranged so that intermittent pulses of ignited gas are ejected through the nozzle from fire to exhaust instead of a single continuous flow as in the above-described embodiments. This provides higher torque on the drive shaft from the same volume of ignitable gas.

The means for closing the nozzle is indicated generally by the number 200.

It comprises a shaft 201 having a pair of hollow circular vanes 202, 203 attached thereto forming a butterfly valve so that in cross section at its center the vanes present a generally star-shaped appearance as shown in FIG. 22. The shaft 201 is mounted for rotation in suitable bearings which are provided in the walls of the nozzle.

Attached to the end of the shaft which projects into the passage 100 is a disc 205 which carries a pin 206.

The rod 207 is mounted for reciprocation in passages in the arms 208, 209 of the bracket 210 which is secured to the nozzle. The rod 207 is urged in one direction by the spring 211.

Secured to the rod 207 is the member 212 which is provided with a longitudinal slot 213 receiving the end of the pin 206.

When the gas in the combustion chamber is ignited, it impinges upon one of the vanes 202 or 203 causing the shaft 201 to be rotated. Then the pin 206 acting in the slot 213 of member 212 causes the rod 207 to move longitudinally compressing the spring 211 to arrest the rotation of the shaft 201 thus interrupting the full flow of gas through the nozzle.

Another function of the spring 211 is to stop rotation of the shaft 201 during intake.

In this way, intermittent pulses of ignited gas are ejected through the nozzle during the fire and burn cycles.

The purpose of the protrusion 215 in the vane 203 is to provide a greater area at one side of the vane than at the other side so that a greater rotating pressure is exerted when the vane 203 is presented to the flow of gas outwardly of the nozzle than when the vane 202 is presented to such outward flow. This provides an initial starting of revolution of the shaft 201.

The pin 206, shaft 201 and vanes 202, 203 are cooled by the cooling fluid in the passages 100.

DETAILED DESCRIPTION OF THE EMBODIMENT OF FIGS. 24 AND 25

In this embodiment, a ring 230 is secured to the wall of the casing 12a and it is provided with a series of pockets 230a, 230b, 230c, etc. each of which is of about the same diameter as the diameter of the nozzles 17a.

The rotor rotates counterclockwise looking at FIG. 24.

The nozzle 17a is provided with an extension 231 which completely covers one pocket 230a when the orifice of the nozzle is registering with the pocket 230b, so that when the nozzle beings to register with the pocket 230a gas does not escape from the pocket 230a because the extension is longer than the pocket. There are no pockets in the ring at the portion thereof which faces the nozzle of an expansion chamber during intake.

The nozzle 17a is provided with another extension 232 which forms a pocket 233. As the rotor rotates counterclockwise, wall 232a of extension 232 passes upwardly so that gas from the pocket 230b expands into pocket 230c and helps rotate the rotor.

It will be apparent to persons skilled in the art that this embodiment also provides intermittent pulses from the nozzles rather than a continuous flow between fire and exhaust positions.

DETAILED DESCRIPTION OF THE EMBODIMENT OF FIGS. 26 AND 27

In this embodiment, the ring 250 is similar to the ring 230 of FIGS. 24 and 25 except that it is mounted for rotation in the bearings 251 which are provided in the wall of the casing 12a. The casing 12a is made in two parts, 12b and 12c.

The enclosure band 252 is secured to the two parts 12b and 12c and holds them together as a unit and also seals the ring 250.

Three rods 254 secure the ring 250 to the inner ring gear disc 255. The teeth of this gear mesh with the teeth of the idler gear 256 which is mounted for rotation about the pin 257 which is secured to the plate 15b'.

The teeth of the idler gear also mesh with the teeth of the gear 157 which is secured to the drive shaft 11.

Consequently, the ring 250 is driven in a clockwise direction (looking at FIG. 27) by the pulses of expanding gas which emerge from the nozzles 17a and the ring aids in driving the drive shaft 11 through rods 254, gear disc 255, idler gear 256 and shaft gear 157.

DETAILED DESCRIPTION OF THE EMBODIMENT OF FIGS. 28 to 33 and 37

FIGS. 28 to 33 show an embodiment of a rotary turbine engine with continuous combustion.

Figure 29:
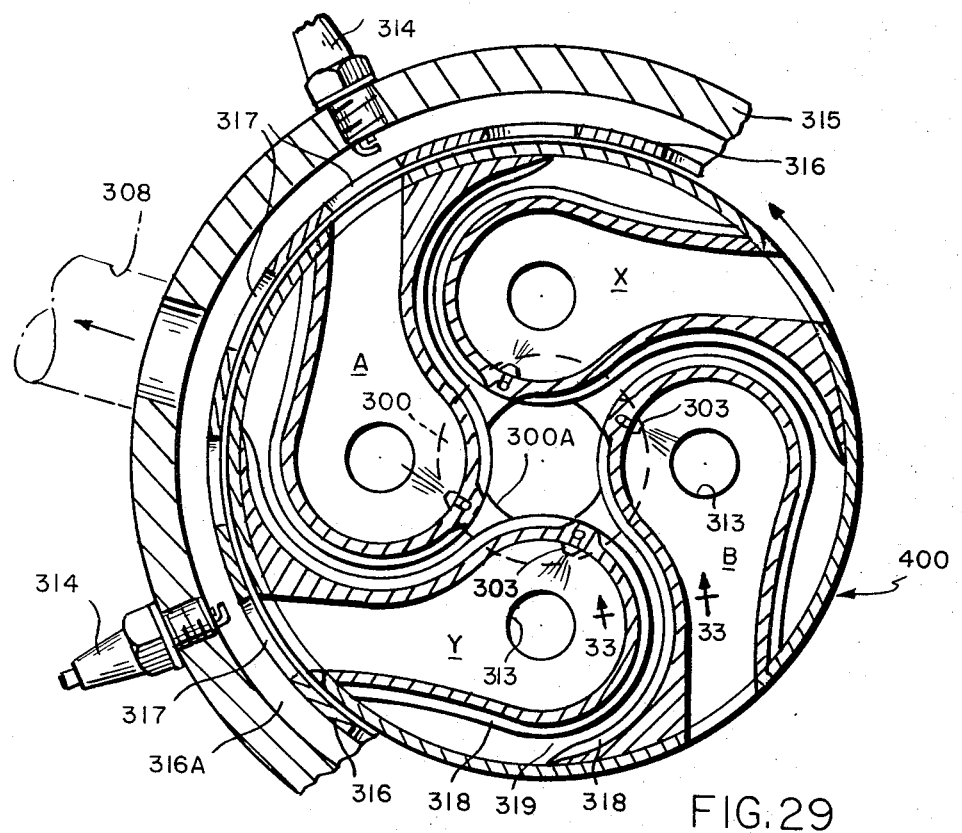
FIG. 29 is an enlarged section on the line 29—29 of FIG. 28 with parts broken away.
Figure 30:
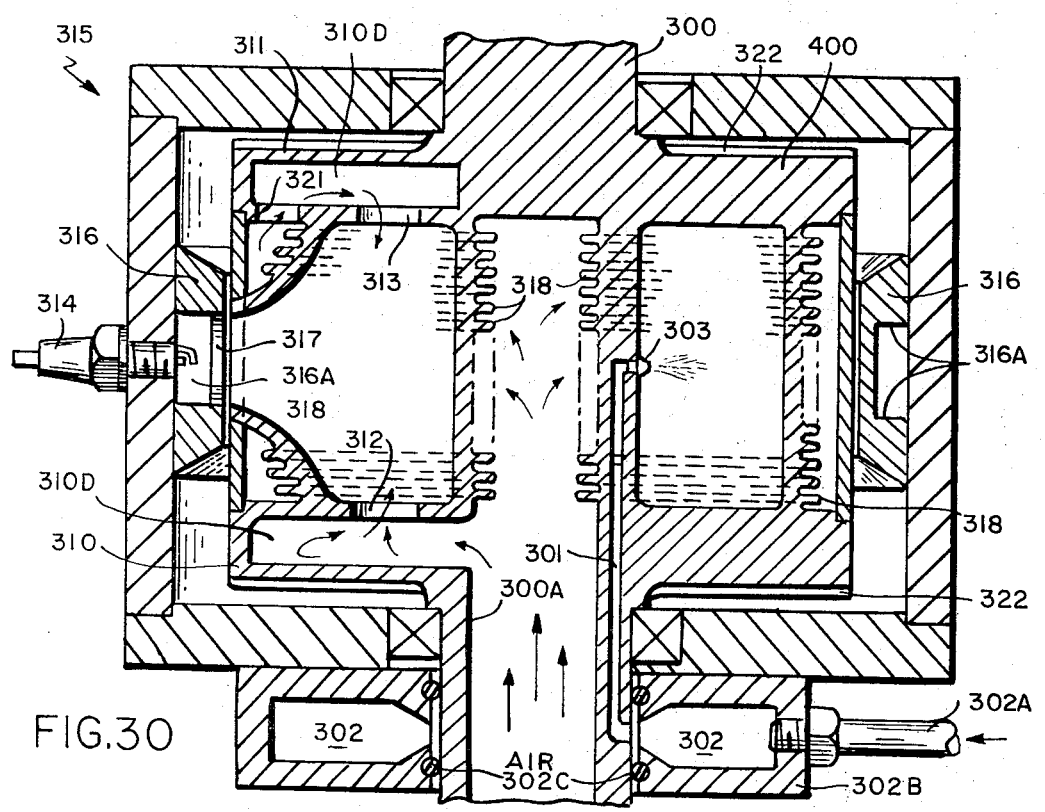
FIG. 30 is an enlarged section on the line 30—30 of FIG. 28.

In this embodiment, the wall of the drive shaft 300 contains four fuel passages 301 (FIGS. 29, 30 and 31). These passages afford communication between the pressurized fuel chamber 302 (FIG. 30) and the combustion chambers A, B, X and Y by means of injectors or nozzles 303 (FIGS. 29 and 30). The fuel is supplied to the chamber 302 by the inlet tube 302A. The fuel is thus continuously introduced into presupercharged combustion chambers. The member 302B in which the fuel chamber 302 is formed is secured to one end wall of the casing 315 and the drive shaft 300 is mounted for rotation in the central orifice of member 302B by O rings 302C (FIG. 30).

The air for supercharging of the combustion chambers is provided by two centrifugal air compressors 304 and 306 (FIG. 28). The compressor 304 is mechanically driven by the drive shaft by means of a pair of sheaves or pulleys 305A and 305B and the belt or cable 305C which is passed around the sheaves as shown in FIG. 28. Sheave 305A is secured to the drive shaft 300 and sheave 305B is secured to the shaft of the air compressor 304. The air compressor is driven at a substantially higher speed than the drive shaft, the diameter of the pulley 305B being substantially smaller than the diameter of the pulley 305A. The air compressor 306 is driven by the exhaust turbine 307 of a turbocharger which is driven at a substantially higher speed than the drive shaft by the exhaust gases emerging from the exhaust duct 308.

The cool compressed air emerging from the compressors is conducted to the stationary housing member 309 which includes the air chamber 309A (FIG. 28). This air chamber communicates with the hollow passage 300A of the drive shaft.

The two impellers 310 and 311 are integral with the rotor 400 (FIGS. 28, 31 and 37). Each impeller comprises four cavities 310A, 310B, 310C and 310D as shown in FIGS. 31 and 37. Impeller 310 is a centrifugal impeller and impeller 311 is a centripetal impeller. The inner end of each cavity of impeller 310 communicates with the hollow passage 300A of the drive shaft as shown in FIGS. 30 and 31. The cavities of centripetal impeller 311 communicate with the hollow portion 300A of the drive shaft through passages 319 between the combustion chambers and through ports 321 of impeller 311, as shown in FIGS. 30 and 37. The cavities of the impeller 310 communicate with the combustion chambers through the ports 312. The cavities of the impeller 311 communicate with the combustion chambers through ports 313. As the rotor rotates counterclockwise, looking at FIGS. 29, 31 and 37, the impellers serve to increase the pressure of the air supplied from the two centrifugal air compressors 304 and 306. Each combustion chamber is thus continuously supercharged in a criss-cross fashion through ports 312 and 313.

Fuel is sprayed into each supercharged combustion chamber and mixed with the compressed air by the continuous turbulence created by criss-cross air feeding through the ports 312 and 313. The mixture is initially ignited by a series of spark plugs 314 positioned in the circular wall of stationary casing 315 which surrounds the rotor 400. Since the feeding of fuel and air is continuous, the flame is self-supporting.

As the ignited gases expand, the pressure in each combustion chamber is metered out through each nozzle and impinges upon the stationary ring 316 which is shown in FIGS. 29, 30 and 32. This ring 316 is attached to the circular wall of the casing 315. It is formed with a peripheral channel 316A. A series of spaced ports 317 are provided in the inner wall of the channel and they afford circumferential communication between the nozzles of the combustion chambers and the channel 316A as the rotor rotates. The exhaust gases pass from the channel 316A to the exhaust duct 308 and then into the exhaust turbine 307.

As the rotor rotates counterclockwise looking at FIG. 29, each nozzle successively registers with other ports 317 and thus causes intermittent release of the pressure which exists in the combustion chamber. These releases of pressure cause the rotor to rotate. The rate of release per revolution depends upon the number and spacing of the ports 317.

Air-cooling fins 318 are provided on the outsides of the arcuate walls of each combustion chamber. The air for cooling is supplied by the two centrifugal compressors 304 and 306 through the hollow portion 300A of the drive shaft and the passages 319 between the outside walls of the combustion chambers as shown in FIGS. 29 and 33.

As the rotor rotates counterclockwise looking at FIG. 29, the cooling passages 319 and the fins 318 cause the entire rotor to function as a big centrifugal impeller due to the unique design of the combustion chambers. The air which is introduced through the hollow portion 300A of the drive shaft circulates around each combustion chamber and extracts heat from the cooling fins. This air is then passed through ports 321 into the cavities 310A, B, C and D of the impeller 311 from which it enters the combustion chambers.

Cooling fins 322 are also provided on the outside end walls of impellers 310 and 311 as shown in FIGS. 30 and 32. These serve to cool the rotor as a whole, whereas the combustion chambers are cooled from inside by the fins 318.

Referring to FIG. 29 of the drawings, as well as to the corresponding figures for all of the other embodiments of the invention described above, it will be noted that each combustion chamber is formed by spaced end walls which are substantially normal to the axis of the drive shaft and also comprises a substantially arcuate wall extending between said end walls and formed by a substantially arcuate plane which is generated about a line which is substantially at the intersection of a plane which coincides with the longitudinal axis of the nozzle and a plane which substantially coincides with a radius of the rotor which is normal to said second plane so that a maximum utilization of pressure per square inch of expanding gases acting on the inside wall of the combustion chamber is attained.

It will also be noted that each embodiment also includes means for supercharging the combustion chambers comprising a centrifugal air compressor driven by the drive shaft at a substantially higher speed than the drive shaft, whereby insuring substantially complete combustion of the ignitable gases.

It will also be noted that the axis of each nozzle is substantially perpendicular to a line which is perpendicular to the axis of the drive shaft and that the nozzles point in different directions whereby a greater portion of the pressure produced by the combustion of the ignitable gas may be utilized by decreasing the diameter of the inner surface of the arcuate wall of each combustion chamber formed by said arcuate plane and increasing the width of the combustion chamber so that the volume of each combustion chamber remains unchanged and a maximum utiliation of pressure per square inch acting on the inside arcuate wall of each combustion chamber is utilized.

It will also be noted that because the axis of each nozzle is substantially perpendicular to a line which is perpendicular to the axis of the drive shaft and the nozzles point in different directions, the torque of the drive shaft may be increased by increasing the distance from the axis of the drive shaft to the point of intersection between the axis of the nozzle and the perpendicular to the axis of the drive shaft.

While certain desirable embodiments have been described in detail, it is to be understood that the present disclosure is for the purpose of illustration only and that this invention includes all modifications and equivalents which fall within the scope of the appended claims.

I claim:

1. A rotary turbine engine comprising a drive shaft, a rotor integral with the drive shaft, said rotor comprising a plurality of combustion chambers spaced radially with respect to the drive shaft, a substantially cylindrical stationary casing surrounding the rotor, each combustion chamber comprising spaced end walls substantially normal to the axis of the drive shaft and having a nozzle extending outwardly from the chamber with its axis directed towards the peripheral wall of the casing, each combustion chamber also comprising a substantially arcuate wall extending between said end walls formed by a substantially arcuate plane which is generated about a line which is substantially at the intersection of a plane which coincides with the longitudinal axis of the nozzle and a plane which substantially coincides with a radius of the rotor which is substantially normal to the second plane, means for supercharging the combustion chamber comprising a centrifugal air compressor driven by the drive shaft at a substantially higher speed than the drive shaft, means for providing communication between said centrifugal air compressor and said combustion chambers, means for injecting ignitable gas to said combustion chambers and means for igniting said gas in said combustion chambers to cause expansion thereof and the expanded gases to emerge from said nozzles thereby causing rotation of the rotor.

2. The engine of claim 1 wherein the means for injecting ignitable gas to the combustion chambers comprises a plurality of fuel passages in the drive shaft, each fuel passage terminating at its inner end in an injector which communicates with a combustion chamber.

3. The engine of claim 2 wherein the fuel is provided from a pressurized fuel chamber in a member attached to an end wall of the casing, said fuel chamber communicating with the outer ends of said fuel passages.

4. The engine of claim 1 wherein the drive shaft comprises an air passage communicating at one end with said centrifugal air compressor and first impeller means integral with the drive shaft and adjacent to one side of the combustion chambers, said impeller means comprising a plurality of cavities which extend generally radially outwardly from said air passage and ports providing communication between said cavities and said combustion chambers through one side of the combustion chambers.

5. The engine of claim 4 which also comprises second impeller means positioned adjacent to another side of the combustion chambers, said second impeller means comprising a plurality of generally radial cavities communicating with said air passage and ports providing communication between said cavities and said combustion chambers through said another side of the combustion chambers, whereby cross supercharging of the compressed air admitted to each combustion chamber is effected by said ports which pass through different sides of each combustion chamber.

6. The engine of claim 5 wherein at least portions of said arcuate walls of the combustion chambers formed by said arcuate planes are spaced apart providing passages between adjacent walls of the combustion chambers which communicate with said drive shaft air passage, and ports in the walls of the cavities of said second impeller means providing communication between said arcuate passages and said second impeller cavities whereby the compressed air passes from said arcuate passages to said second impeller cavities and thence to the interiors of the combustion chambers.

7. The engine of claim 1 wherein the drive shaft has an air passage communicating at one end with said centrifugal air compressor, wherein at least portions of said arcuate walls of the combustion chambers formed by said arcuate planes are spaced apart providing passages between adjacent walls which communicate with said drive shaft air passage and wherein said arcuate walls are provided with a plurality of fins which project into the passages between said arcuate walls whereby the walls of the combustion chambers are cooled by the compressed air in said drive shaft air passage.

8. The engine of claim 1 which also comprises a turbocharger exterior of the casing, means for providing communication between the exhaust gases which emerge from the nozzles of the combustion chambers and the exhaust turbine of the turbocharger, a second centrifugal air compressor driven by said exhaust turbine, means for providing communication between said second centrifugal air compressor and the compressed air emitted from the first centrifugal air compressor thereby to aid in additionally initially supercharging said combustion chambers.

9. The engine of claim 8 which also comprises an annular member attached to the peripheral wall of said casing, said annular member being formed with an annular passage between said peripheral wall and an inner wall of the annular member, said inner wall being provided with a series of spaced ports for providing communication between the nozzles of the combustion chambers and said annular passage, whereby exhaust gases emerging from the nozzles periodically pass to said annular passage, and means for providing communication between said annular passage and said exhaust turbocharger for continuously passing exhaust gases to said exhaust turbocharger.

10. The engine of claim 1 wherein the axis of each nozzle is substantially perpendicular to a line which is perpendicular to the axis of the drive shaft and said nozzles point in different directions, whereby a greater portion of the pressure produced by the combustion of the ignitable gas may be utilized by decreasing the diameter of the inner surface of said arcuate wall of the combustion chamber formed by said arcuate plane and increasing the width of the combustion chamber whereby the volume of said combustion chamber remains unchanged and a maximum utilization of pressure per square inch acting on the inside arcuate wall of said combustion chamber is attained.

11. The engine of claim 1 wherein the axis of each nozzle is substantially perpendicular to a line which is perpendicular to the axis of the drive shaft and said nozzles point different directions, whereby torque at the drive shaft may be increased by increasing the distance from the axis of the drive shaft to the point of intersection between said axis of the nozzle and said perpendicular to the axis of the drive shaft.

12. The engine of claim 1 which also comprises means for providing periodic intake of ignitable gas to said combustion chambers, means for periodically igniting said ignitable gas and means for causing periodic exhaust of residual gases from said combustion chambers through an exhaust passage.

13. The engine of claim 1 wherein the outer faces of at least one of said spaced end walls comprises ports for periodically providing communication between said combustion chambers and the source of said ignitable gas and said means for igniting said ignitable gas.

14. The engine of claim 13 wherein at least a portion of one end of the substantially cylindrical casing engages at least portions of said one end wall of the combustion chambers and comprises ports which successively provide communication between said intake and ignition ports in said portion of said one end wall of said combustion chamber.

15. The engine of claim 1 wherein a portion of at least one of said spaced end walls comprises ports for periodically providing communication between said combustion chambers and an exhaust passage.

16. The engine of claim 15 wherein at least a portion of one end of the substantially cylindrical casing engages at least portions of said one end wall which contains said exhaust ports and comprises a port which provides communication between said exhaust ports and an exhaust passage.

17. The engine of claim 1 which also comprises means for periodically closing said nozzles which comprises means adjacent to the peripheral wall of said substantially cylindrical casing for forming a series of spaced pockets which are of substantially the same diameter as the diameter of the orifices of the nozzles and which face said orifices.

18. The engine of claim 17 wherein said means for closing said nozzles is secured to said peripheral wall of said casing.

19. The engine of claim 17 wherein said means for forming a series of pockets is devoid of pockets at the portion thereof which faces a nozzle of a combustion chamber during intake.

\* \* \* \* \*

UNITED STATES PATENT OFFICE
CERTIFICATE OF CORRECTION

Patent No. 3,811,275                    Dated May 21, 1974

Inventor(s)   Antonio C. Mastrobuono

It is certified that error appears in the above-identified patent and that said Letters Patent are hereby corrected as shown below:

Column 19, line 2, after "point" insert ...in...

Signed and sealed this 10th day of September 1974.

(SEAL)
Attest:

McCOY M. GIBSON, JR.                C. MARSHALL DANN
Attesting Officer                   Commissioner of Patents